United States Patent [19]

Kobayashi

[11] Patent Number: 5,209,170
[45] Date of Patent: May 11, 1993

[54] SETTING MACHINE

[75] Inventor: Etsuo Kobayashi, Suzaka, Japan

[73] Assignee: Shadan Hojin Naganoken Nokyo Chiiki Kaihatsu Kiko, Japan

[21] Appl. No.: 691,030
[22] PCT Filed: Dec. 28, 1989
[86] PCT No.: PCT/JP89/01338
  § 371 Date: Jun. 25, 1991
  § 102(e) Date: Jun. 25, 1991
[87] PCT Pub. No.: WO90/07263
  PCT Pub. Date: Jul. 12, 1990

[30] Foreign Application Priority Data

Dec. 29, 1988 [JP] Japan .................. 63-331325
Dec. 29, 1988 [JP] Japan .................. 63-331326
Jan. 31, 1989 [JP] Japan .................. 1-19427
Jan. 31, 1989 [JP] Japan .................. 1-19428
Jan. 31, 1989 [JP] Japan .................. 1-19429

[51] Int. Cl.$^5$ .................................................. A01C 11/02
[52] U.S. Cl. .................................. 111/105; 111/115; 406/151; 406/196
[58] Field of Search ............... 111/105, 100, 103, 104, 111/115, 117, 89, 99; 47/1.7, 1.01; 414/527, 467; 406/151, 196, 180, 177, 117, 77-79

[56] References Cited

U.S. PATENT DOCUMENTS

| | | | |
|---|---|---|---|
| 3,446,164 | 5/1969 | Huang et al. | |
| 3,712,252 | 1/1973 | Huang | 111/105 |
| 3,872,805 | 3/1975 | Kolk et al. | 111/115 |
| 3,998,171 | 12/1976 | Lofgren et al. | 111/117 |
| 4,003,530 | 1/1977 | Davis | 406/177 |
| 4,067,268 | 1/1978 | Lofgren et al. | 111/115 |
| 4,130,072 | 12/1978 | Dedolph | 111/105 |
| 4,341,333 | 7/1982 | Boa et al. | 111/115 |
| 4,440,101 | 4/1984 | Edwards et al. | 111/105 |
| 4,843,983 | 7/1989 | Olson | 406/196 |

FOREIGN PATENT DOCUMENTS

| | | |
|---|---|---|
| 0023702 | 11/1981 | European Pat. Off. . |
| 353800 | 2/1990 | European Pat. Off. ............ 111/100 |
| 2432265 | 2/1980 | France . |
| 2560482 | 6/1985 | France . |
| 568111 | 1/1981 | Japan . |
| 8706791 | 11/1987 | PCT Int'l Appl. . |
| 1463664 | 3/1989 | U.S.S.R. .............................. 406/151 |

Primary Examiner—Peter M. Cuomo
Assistant Examiner—Spencer Warnick
Attorney, Agent, or Firm—Renner, Otto, Boisselle & Sklar

[57] ABSTRACT

A setting machine for transplanting plugged seedlings of vegetables along predetermined transplantation ridges in a field used in combination with seedling culture trays made of synthetic resin and formed with cells as through-holes. The setting machine includes a taking-out device for supporting the seedling culture trays and for selectively taking the seedlings out of open bottoms of the cells successively. The taking-out device includes a selecting member adapted to be two-dimensionally positioned in a plane in parallel with the bottom surface of the seedling culture tray, and formed with selecting holes to be aligned with the cells of the seedling culture tray. The setting machine further includes a transfer device for forcibly transferring the seedlings taken out of the cells to a predetermined position by the action of negative pressure, and a transplanting device for transplanting the seedlings into the ground along predetermined transplantation ridges. The setting machine is capable of performing all the operations from taking-out to transplantation of the seedlings completely mechanically, and accomplish remarkable improvement in operation efficiency with significant labor saving, particularly in transplanting seedlings along multiple ridges in fields.

24 Claims, 17 Drawing Sheets

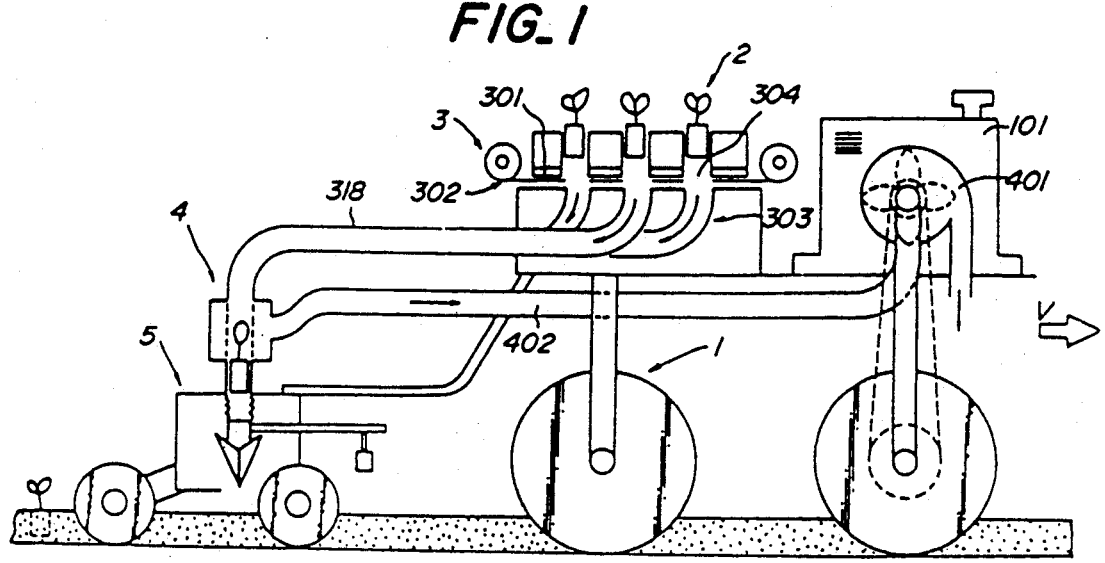
FIG_1
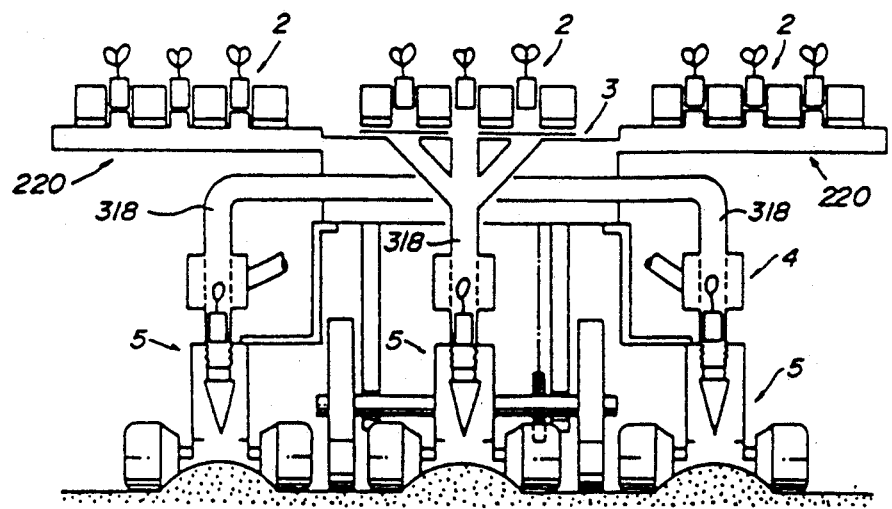
FIG_2

FIG_3A
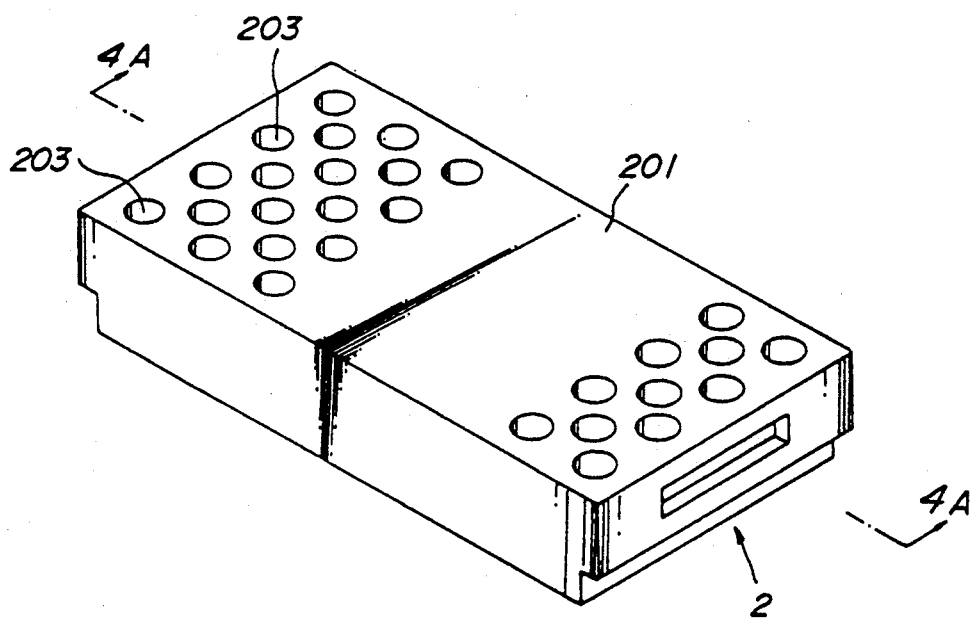
FIG_3B
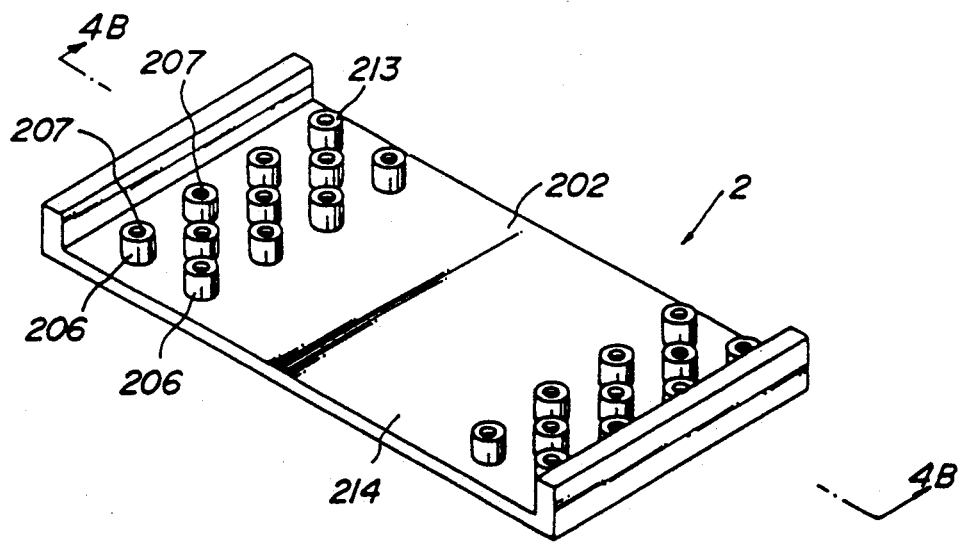

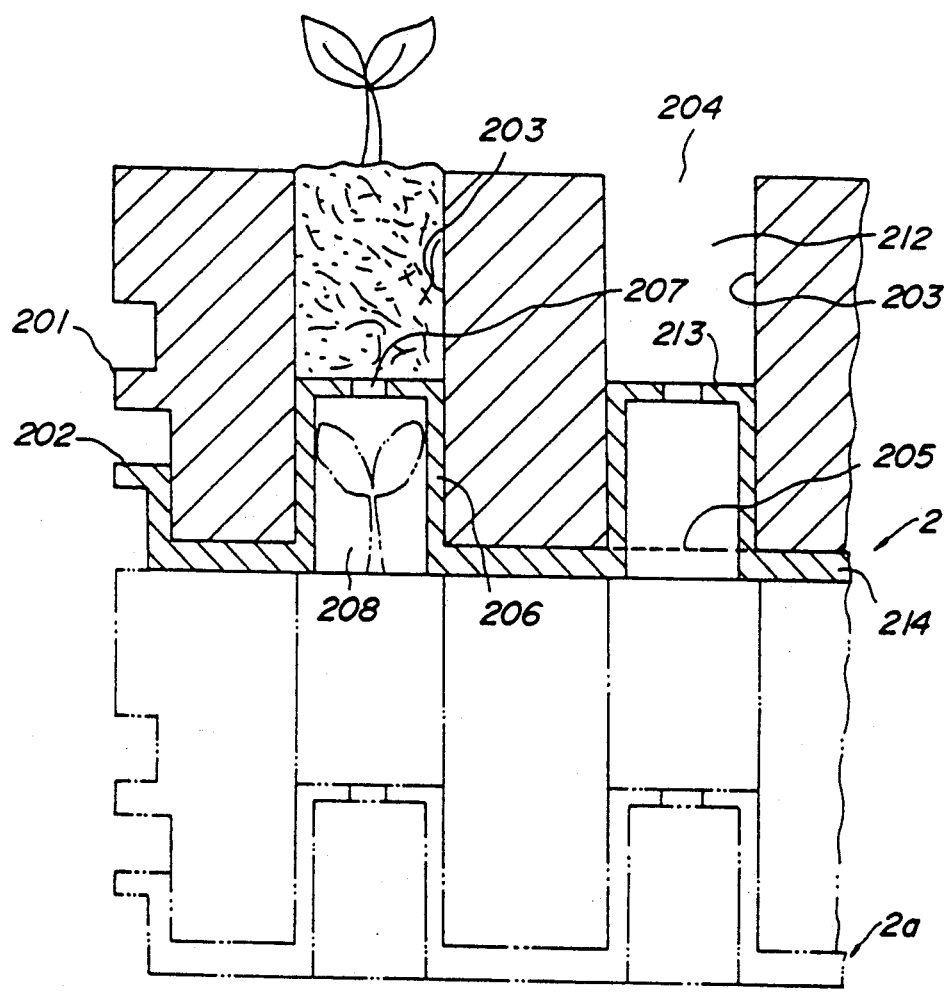
FIG_5

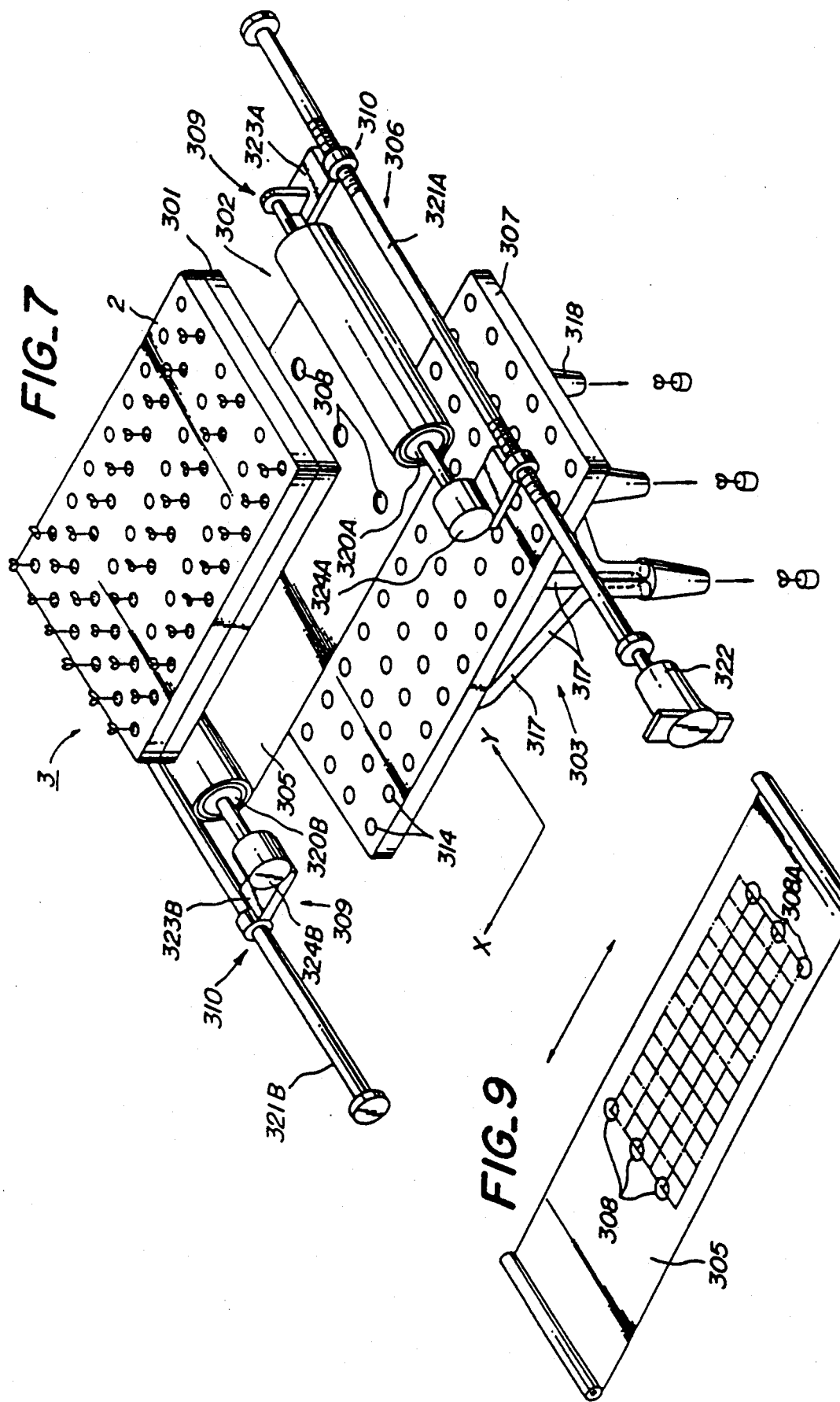

FIG_8
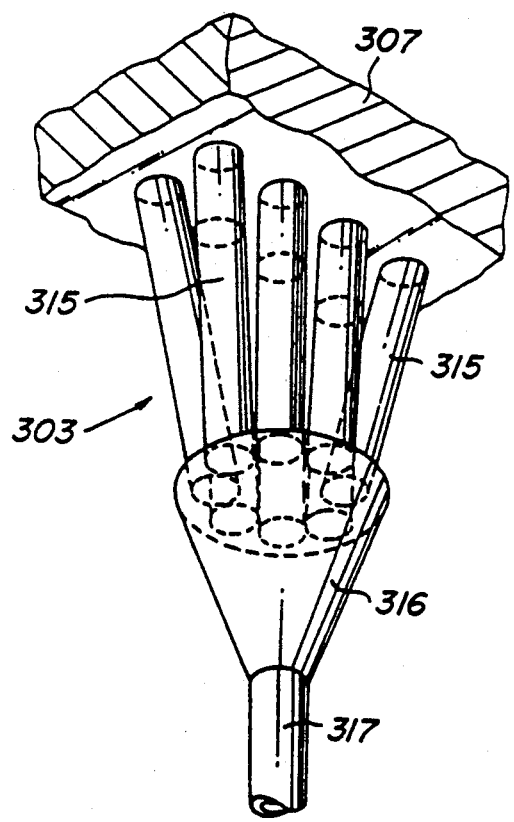

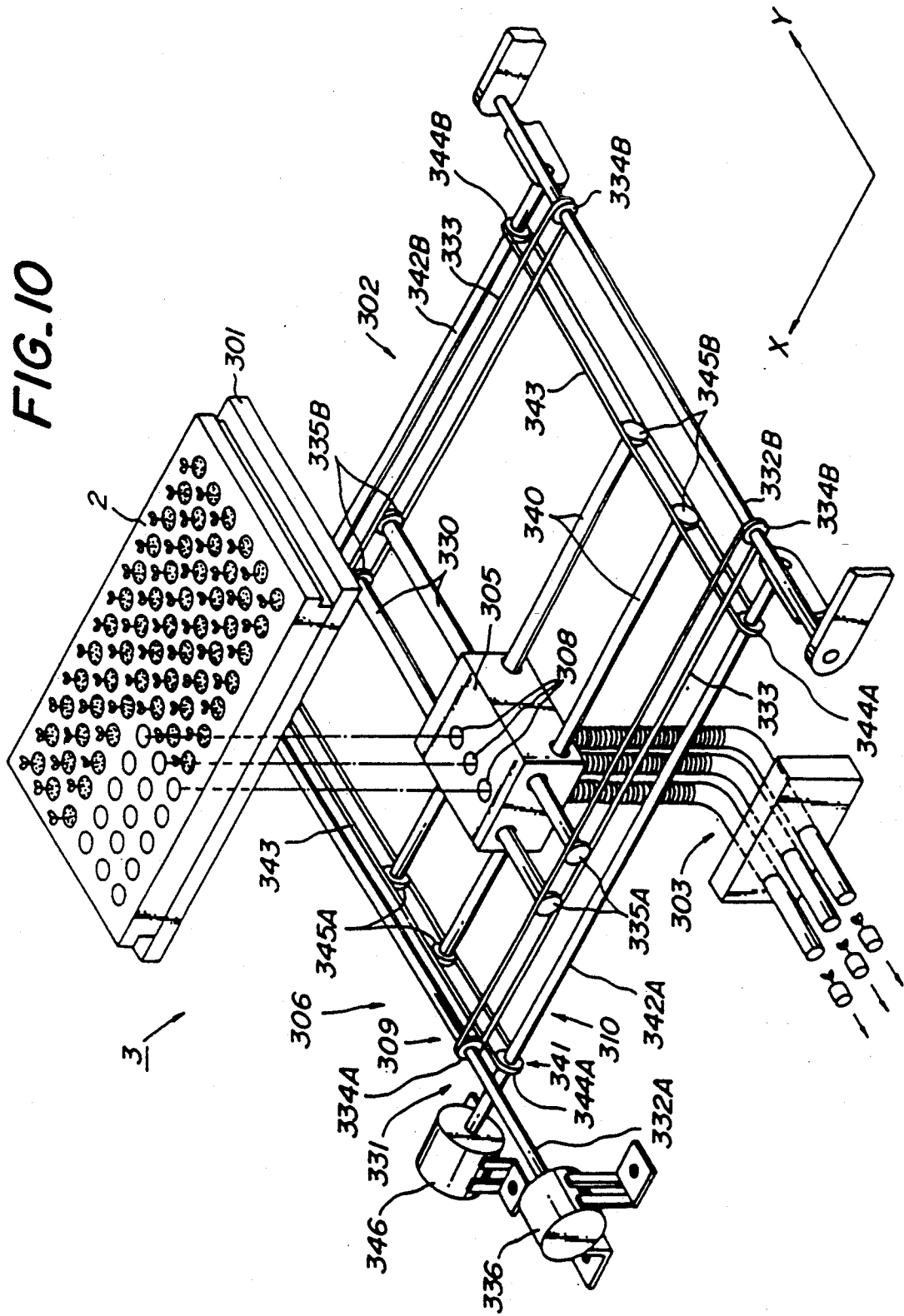

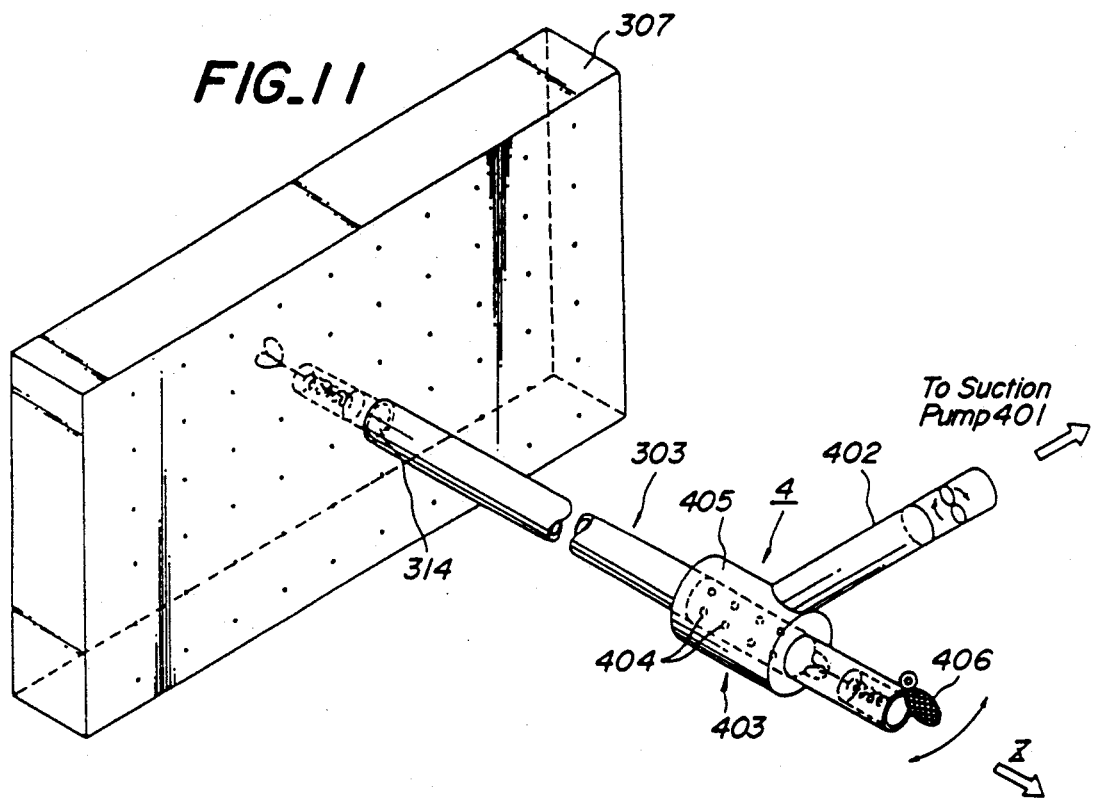
FIG_11
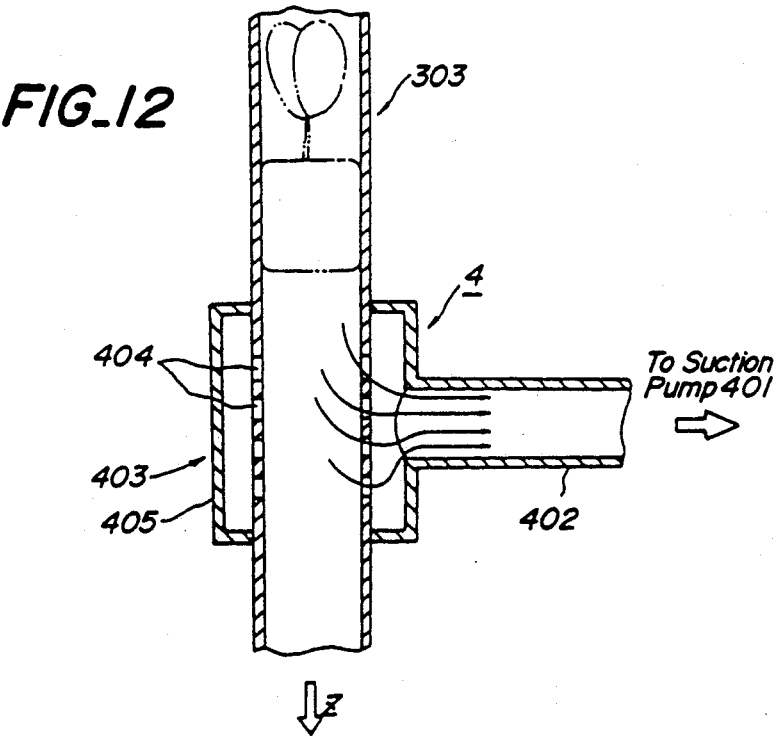
FIG_12

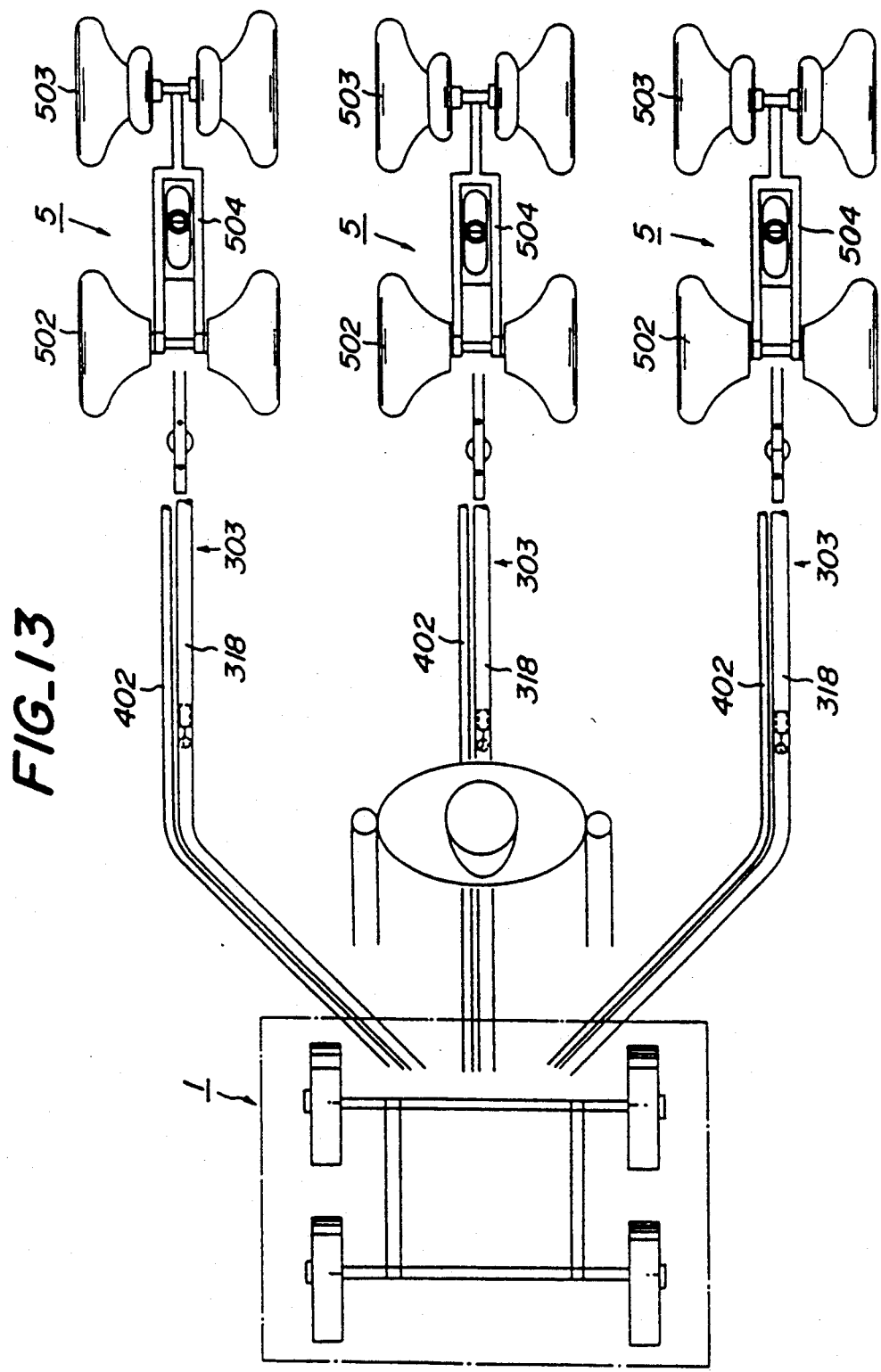

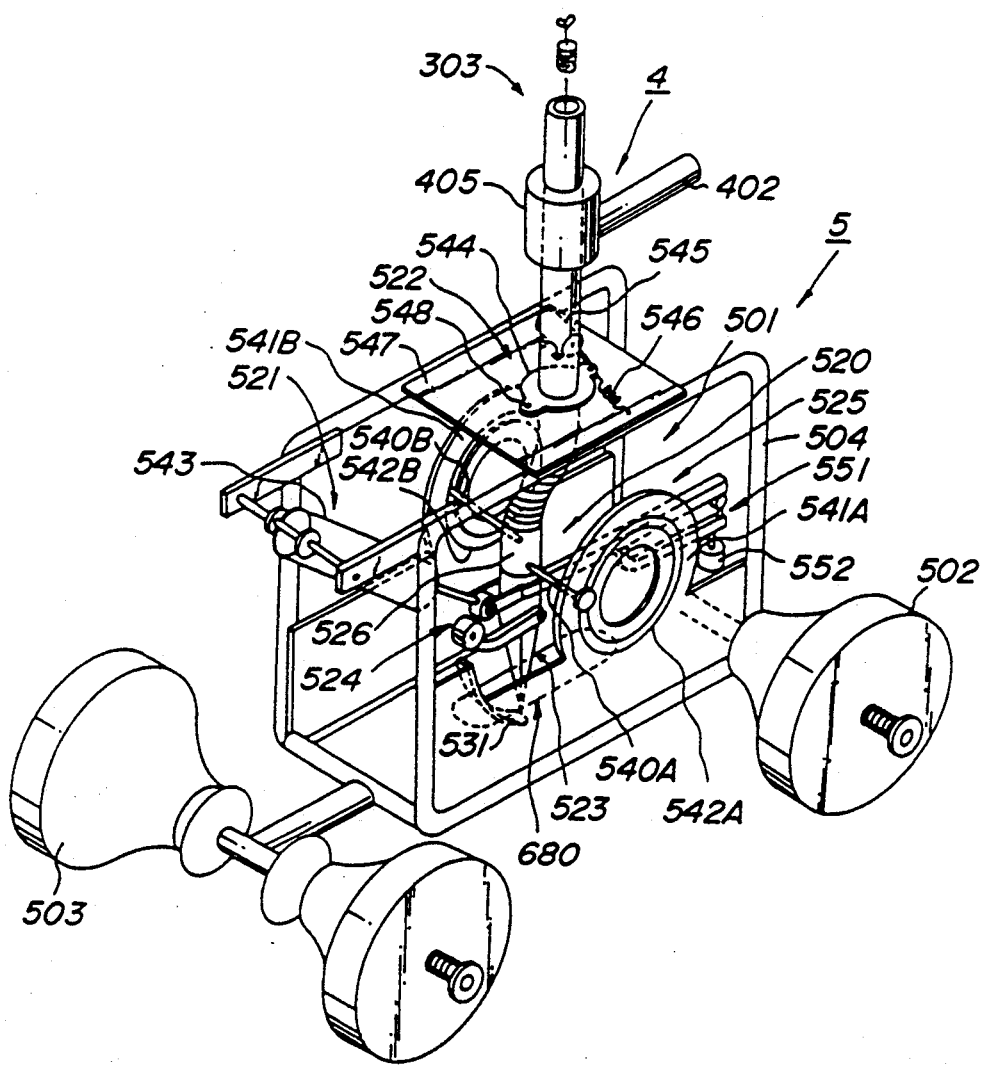
FIG_14

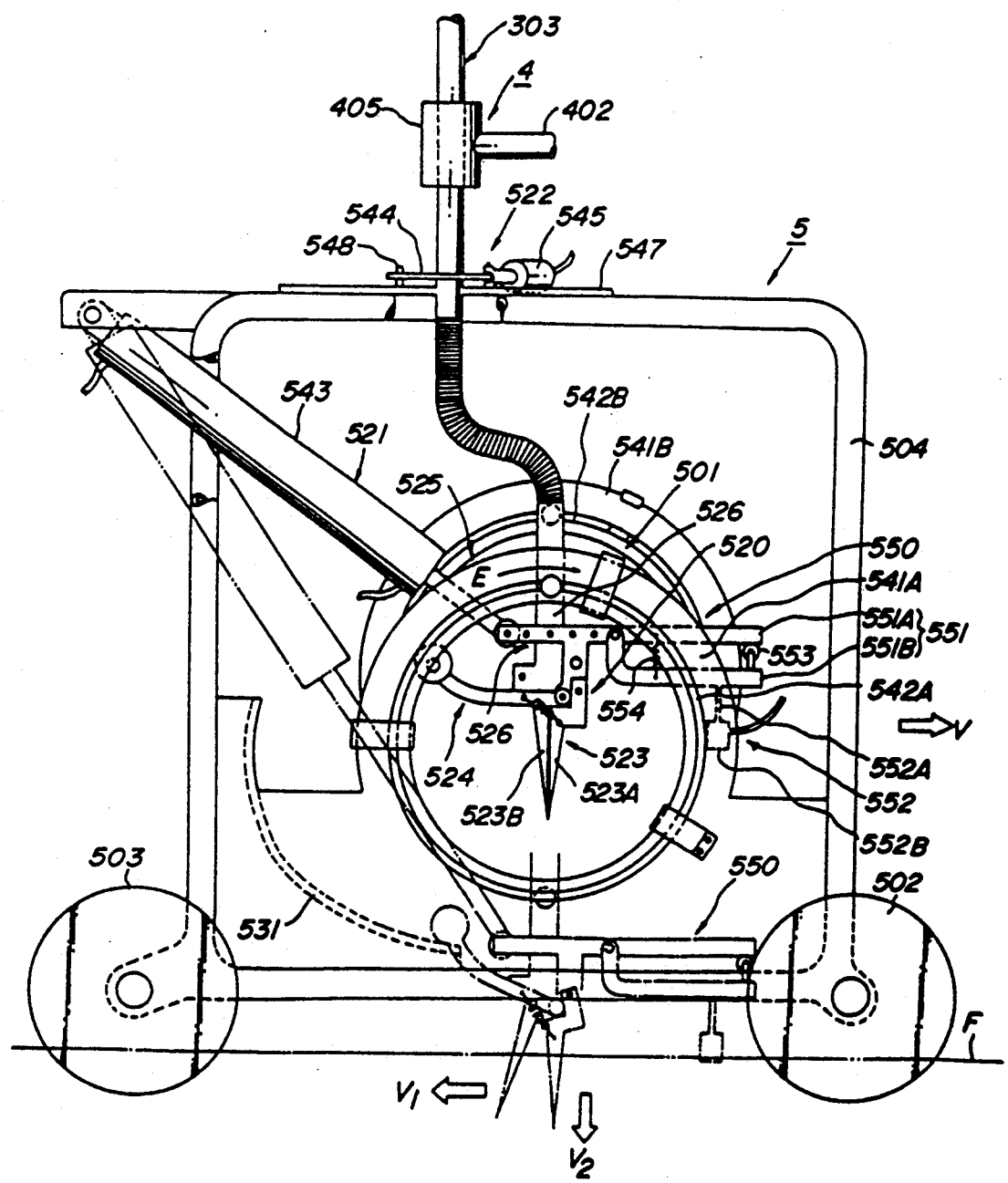

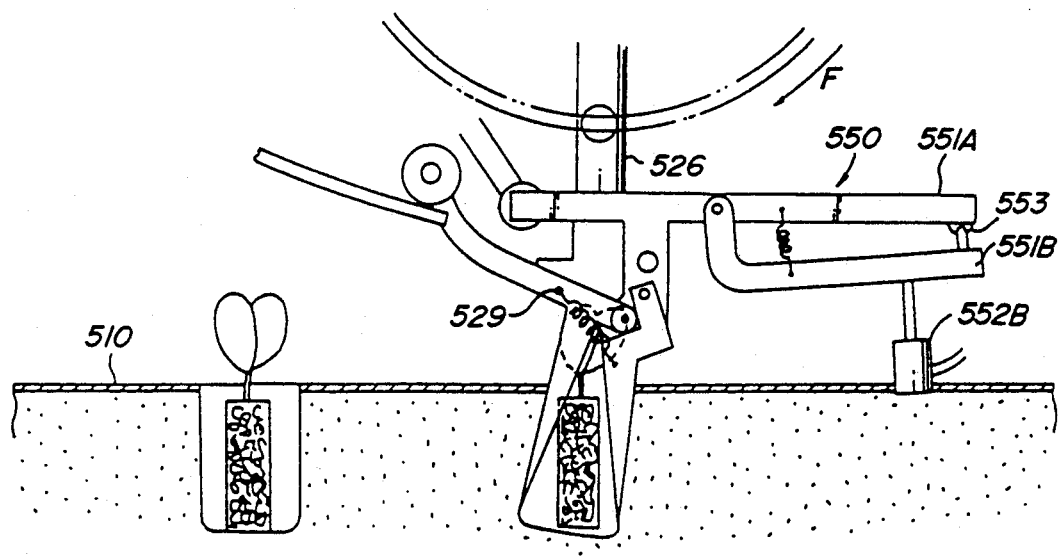
FIG._18
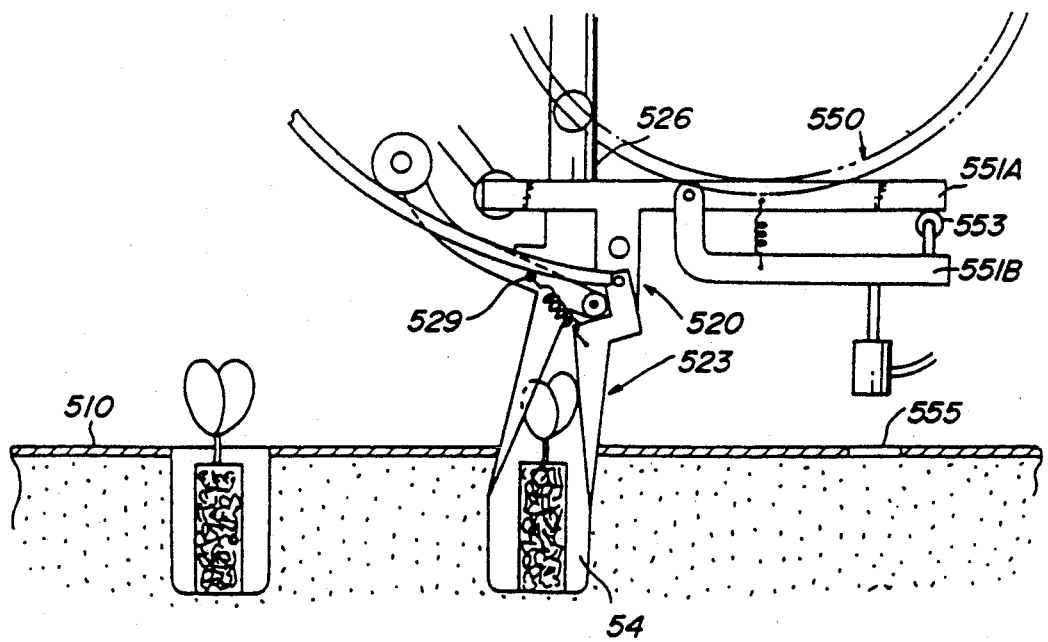
FIG._19

SETTING MACHINE

TECHNICAL FIELD

This invention relates to a setting machine for transplanting plugged seedlings of vegetables along predetermined transplantation ridges in fields.

BACKGROUND ART

Recently, seedlings of vegetables have been cultivated by producers as a specialized profession separate from usual farmers. As a result, so-called "plugged seedlings" are supplied by the cultivators of seedlings to farmers who work exclusively to plant the supplied plugged seedlings in fields. Such a division of labor has been widely spread. Moreover, farmers in some areas often carry out mechanical planting by setting machines in order to save labour in planting plugged seedlings.

A semi-automatic one has been well known as such a setting machine. This setting machine includes a multiple ridge transplantation trolley dragged by a tractor. On the trolley there are provided a support base for seedling culture trays for supplying seedlings, sets of rotary hoppers operated synchronously with rotation of wheels of the trolley, and transplantation opening members connected with the rotary hoppers. The transplantation opening members periodically penetrate into the ground when the trolley runs. In using the setting machine constructed as above, workers who supply plugged seedlings sit on seats corresponding to respective transplantation ridges in a field, while seedling culture trays are manually supplied in front of these workers by other workers for supplying the trays. Thereafter, plugged seedlings are manually taken out of the trays upwardly and supplied into the hoppers by the first-mentioned workers. The plugged seedlings are forced to penetrate into the ground to be planted by operating the transplantation opening members synchronously with rotation of the wheels of the trolley. In this case, however, there has arisen the following problem. That is, the planting operation is not performed completely automatically, and requires manual operations co-operating with each other which are to be carried out by a tractor operator, one or two workers for supplying the seedling culture trays, and six workers for supplying the plugged seedlings, hence eight or nine workers as a whole. Therefore, it becomes difficult to accomplish improvement in operation efficiency and saving of personal expenses. A highly automatized setting machine has thus long been requested in this industrial field.

In order to fulfill such requirement, there has been proposed a setting machine which is to apply a rice transplanter mechanism. This setting machine includes a support base for supporting seedling culture trays, and a mechanism for pulling seedlings out of the trays on the support base by transplantation pawls to transplant them into the field. This system is realized by the use of seedling culture trays made of paper materials, which are composed of pieces of cardboard arranged in lattice to form a plurality of cells. In this case, after the seedling in each cell has been pulled and separated from the tray by transplantation pawls together with cardboard pieces defining the cell, the seedling is inserted into the ground to be transplanted. However, as the prior art setting machine uses the trays made of paper material, adjacent seedlings often grow whose roots entangle with each other across walls of the cells. As a result, when the seedlings are separated from the paper tray pieces by the transplantation pawls, roots of the seedlings are often torn off or damaged, permitting viruses to invade the roots. Moreover, there is a risk that growth of the roots of the seedlings is detrimentally affected by the cardboard pieces set in the ground together with the seedlings.

Seedling culture trays made of synthetic resins have been known, including independent cells to prevent roots of adjacent seedlings from entangling with each other. However, such seedling culture trays have been used only in completely manual operation or semiautomatic operation. In more detail, different from the paper trays, the cells of the trays made of synthetic resin could not be separated from the trays by pulling them by means of the transplantation pawls. Therefore, it has been considered that completely mechanical transplanting operation with synthetic resin trays is practically impossible or very difficult.

DISCLOSURE OF THE INVENTION

It is an object of the invention to provide a setting machine which eliminates disadvantages of the prior art described above and is completely automatized with a series of mechanical operations in an easy manner utilizing seedling culture trays made of a synthetic resin.

This invention resides in the novel discovery that a complete mechanical planting operation can be accomplished with seedling culture trays made of synthetic resin by taking seedlings out of cells of the trays with the aid of action of negative pressure, instead of separation of the seedlings from cells of trays with transplantation pawls.

According to the invention, the setting machine includes a movable vehicle body which comprises seedling removal means for supporting a seedling culture tray made of a synthetic resin having a plurality of cells for receiving therein seedlings to be transplanted, and for selectively taking the seedlings out of predetermined cells of said tray successively, seedling force-transfer means for forcedly transferring the taken out seedlings to a predetermined position under negative pressure, and transplanting means for receiving the seedlings transferred to the predetermined position thereat and transplanting them into ground.

With the above-mentioned construction of the setting machine according to the invention, seedlings are selectively taken out of cells of the seedling culture tray arranged on the vehicle body by the action of negative pressure and transferred to the transplanting means by the seedling force-transfer means and the transferred seedlings are transplanted into the ground by the transplanting means. Therefore, all the required operations can be completely mechanically carried out.

BRIEF DESCRIPTION OF THE DRAWINGS

FIG. 1 is a side view illustrating the setting machine;

FIG. 2 is a front elevation illustrating the setting machine;

FIGS. 3A and 3B are perspective views illustrating a tray main body and a bottom body of one embodiment of the seedling culture tray, respectively;

FIG. 5 is an enlarged sectional view of principal parts illustrating piled seedling culture trays;

FIG. 7 is a perspective view illustrating one embodiment of the seedling taking-out device of the setting machine;

FIG. 8 is a perspective view illustrating the upstream end of the transfer pipe of the setting machine;

FIG. 9 is a perspective view illustrating a modification of the selecting device illustrated in FIG. 7;

FIG. 10 is a perspective view illustrating another embodiment of the seedling taking-out device of the setting machine;

FIG. 11 is a perspective view illustrating the outline of the seedling force-transfer device of the setting machine;

FIG. 12 is a sectional view illustrating principal parts of the seedling force-transfer device;

FIG. 13 is a plan view illustrating a whole arrangement of the seedling force-transfer device;

FIG. 14 is a perspective view illustrating transplanting device to be used in setting seedlings;

FIG. 15 is a side view of the transplanting device shown in FIG. 14;

FIGS. 17-19 are explanatory views of operations of the drilling unit provided in the planting device;

BEST MODE FOR CARRYING OUT THE INVENTION

Figure 4A:
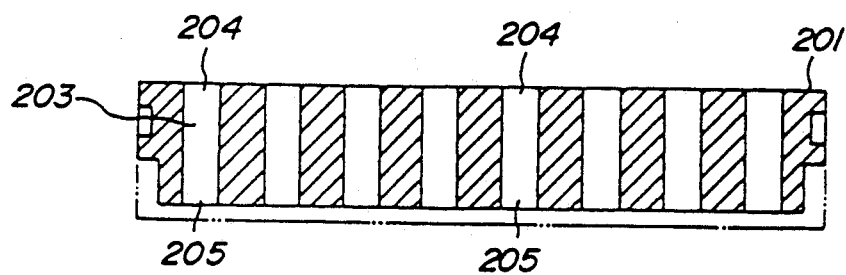
FIG. 4A is a sectional view taken along the line A—A in FIG. 3A.

Some preferred embodiments of the setting machine according to the invention will be explained in detail with reference to the drawings hereinafter. (General Explanation of Setting Machine)

Referring to FIGS. 1 and 2, the setting machine for transplanting plugged seedlings according to the invention comprises a vehicle body 1 on which is arranged an engine 101 and the like for driving the machine along predetermined transplantation ridges in a field, and seedling taking-out device 3 supporting seedling culture trays 2 for receiving therein plugged seedlings to be planted and selectively taking the seedlings out of the seedling culture tray 2. The setting machine further comprises seedling force-transfer device 4 for forcibly transferring the taken seedlings under negative pressure to predetermined positions, and transplanting device 5 for successively transplanting the transferred seedlings along the transplantation ridges. With such a construction of the setting machine, the transplantation of seedlings can be completely automatized in the mode later described. As the trays made of a synthetic resin are essential for the setting machine according to the invention, first the concrete construction of the seedling culture trays will be explained.

Seedling Culture Tray

As shown in FIGS. 3A and 3B, the seedling culture tray 2 is formed of a foamable synthetic resin such as foaming styrol resin and separable into two parts. The upper part forms a tray main body 201 for accommodating culture soil, while the lower part forms a bottom body 202 adapted to be fitted with the bottom of the tray main body 201.

The tray main body 201 is formed therein with cylindrical cells 203 arranged staggered or in a lattice. Each of the cells 203 includes an open top 204 and an open bottom 205 to form a through-hole in the tray main body 201 as shown in FIG. 4A. The shape of the cells 203 formed by the through-holes is not limited to cylindrical as shown. It may be, for example, hexagonal prismatic. A diameter of the cells 203 and a distance between the open tops 204 and the open bottoms 205 or a thickness of the tray main body 201 may be selected depending upon the amount of the soil received in the cells.

Figure 4B:
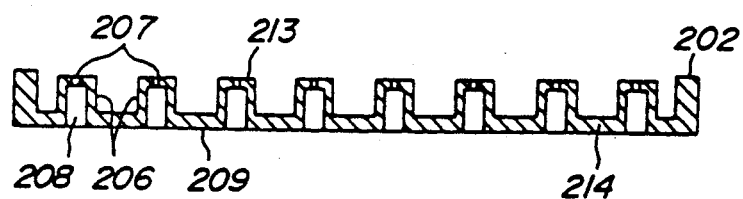
FIG. 4B is a sectional view taken along the line B—B in FIG. 3B.

As shown in FIG. 3B, the bottom body 202 forming part of the seedling culture tray 2 is formed on its bottom plate 214 with a plurality of cylindrical fitting protrusions 206 extending to close the open bottoms of the respective cells 203 of the tray main body 201 when the bottom body 202 is fitted on the tray main body 201. The fitting protrusions 206 are arranged staggered or in a lattice in the same fashion as the cells 203 of the tray main body 201. The fitting protrusions 206 are fitted in the cells 203 of the tray main body 201 and form bottoms of the cells 203 when the tray main body 201 and the bottom body 202 are fitted with each other. Therefore, outer diameters of the fitting protrusions 206 are substantially equal to inner diameters of the open bottoms 205 of the cells 203. Each of the fitting protrusions 206 is formed at its top with a drain opening 207 for draining excessive culture solution supplied into the cells 203. As shown in FIG. 4B, moreover, each of the fitting protrusions 206 forms an inner space 208 therein having a closing top 213 spaced from the bottom plate 214. The inner spaces 208 serve to separate the drain openings 207 upwardly from a bottom surface 209 of the bottom body 202 to improve the efficiency in draining the excessive culture solution.

In more detail, if the drain openings 207 should be flush with the bottom surface 209, there could be a risk of the drain openings 207 being closed by a support base supporting the bottom body 202 so that the excessive culture solution could not be effectively drained. With the construction above described, however, the drain openings 207 are prevented from being closed by the support base so that the excessive culture solution can be drained out of the machine with high efficiency.

The connected state of the tray main body 201 and the bottom body 202 above described will be explained. As shown in FIG. 5, when the fitting protrusions 206 of the bottom body 202 are inserted and fitted in the open bottoms 205 of the cells 203 of the tray main body 201, cylindrical culture soil receiving spaces 212 are formed by the cooperation of the cells 203 with the tops of the fitting protrusions 206. A predetermined amount of culture soil and seeds are supplied into the culture soil receiving spaces 212 and a predetermined amount of culture solution is sprinkled thereover from above to cultivate seedlings. In this case, the seedling culture trays 2 can be piled in multiple stages for cultivating buds of the seedlings with the aid of the bottom bodies 202 shown in FIG. 4B. Buds in the lower trays 2a grown and extending therefrom are accommodated in the spaces 208 formed in the bottom bodies 202 (FIG. 5). The seedling culture trays piled in the multiple stages are maintained in a germination room after seeding for three or four days until buds have grown to four or five mm. Thereafter, the seedling culture trays are transferred into a greenhouse where the trays are arranged on bases without piling so that a culture solution is uniformly sprinkled onto the buds to obtain plugged seedlings sufficiently grown. Therefore, the inner spaces 208 must be sufficiently wide enough to receive the buds. A wide range of inner spaces may of course be needed depending upon lengths of buds.

Figure 6:
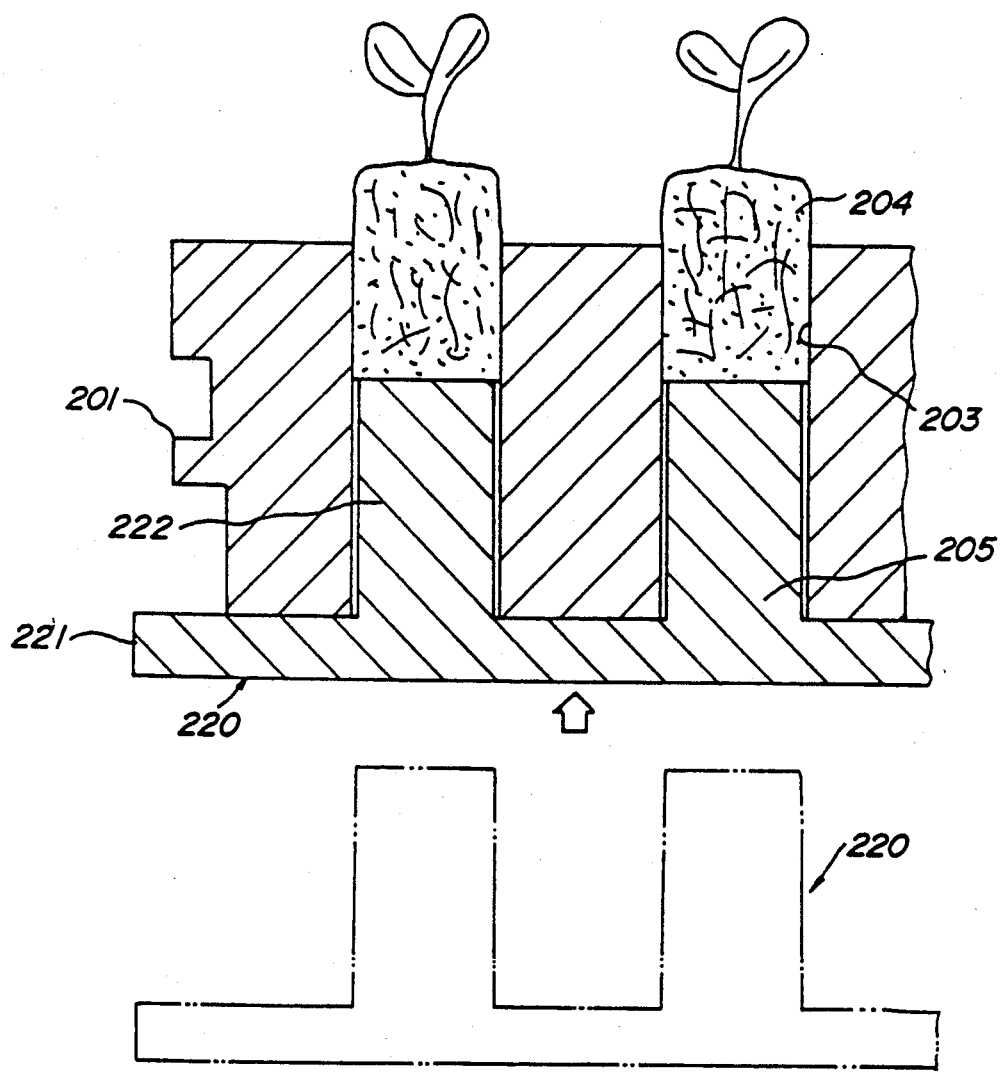
FIG. 6 is a sectional view illustrating a situation of seedlings preliminarily pushed out of the tray main body.

A method of taking seedlings out of the seedling culture trays 2 above described will be explained hereinafter. Upon completion of growth of seedlings in the trays, the seedlings are transplanted into a field. It is therefore desired to be able to take the seedlings out of the trays with ease. Seedling pushing-out device 220 exemplarily shown in FIG. 6 is then utilized for this purpose. The seedling pushing-out device 220 comprises a support base 221 for supporting a tray main body 201 and pushing-out portions 222 extending from the support base 221. Each of the pushing-out portions 222 requires to have a shape substantially the same as that of the open bottom 205 of the tray main body 201 and a height at least higher than that of the fitting protrusion 206 of the bottom body 202 in order to uniformly push the bottom surface of the culture soil to partially extend the seedling beyond the open top 204 of the tray main body 201. By forcing the pushing-out device 220 with the pushing-out portions 222 constructed as above described into the open bottoms 205 of the tray main body 201, the seedlings can be pushed upward out of the tray main body 201. In general, roots of seedlings attached to walls of cells 203 of the trays make it difficult to take the seedlings out of the trays. By the use of the above seedling pushing-out device 220, the roots of the seedlings can be readily separated from the cells to facilitate removal of the seedlings from the trays with ease. In this case, the pushing-out portions 222 uniformly push all the bottom surfaces of the culture soil so that the roots of the seedlings could not be damaged.

With the seedling pushing-out device 220 constructed as above described and arranged on the setting machine according to the invention (FIG. 2), roots of seedlings can be previously separated from the walls of the seedling culture trays before using them in combination with the setting machine, thereby greatly improving the efficiency of the setting operation.

Seedling Taking-Out Device

The seedling taking-out device to be provided in the setting machine according to the invention will be explained hereinbelow.

As shown in FIG. 7, the seedling taking-out device 3 comprises a carrier base 301 for supporting the seedling culture tray 2, a seedling selecting mechanism 302 movable in two dimensional directions below the carrier base 301 for selectively taking the seedlings out of the open bottoms 205 of the seedling culture tray 2, and transfer pipes 303 arranged between the seedling selecting mechanism 302 and the force-transfer device 4 (FIGS. 1 and 2) for transferring the seedlings taken out of the trays onto the downstream side thereof.

The carrier base 301 is fixed to a top of a frame of the vehicle body 1 and has a plurality of openings 304 (FIG. 1) corresponding in shape and arrangement to those of the open bottoms 205 of the seedling culture tray 2 (FIG. 1). The openings 304 (FIG. 1) preferably have diameters somewhat larger than diameters of the open bottoms 205 of the seedling culture tray.

The seedling selecting mechanism 302 arranged below the carrier base 301 comprises a selecting member 305 as a support member slidable in a plane extending in parallel with the lower surface of the carrier base 301, driving unit for driving the selecting member 305 in the two dimensional directions or X direction (longitudinal direction of the seedling culture tray) and Y direction (traverse or width direction of the tray), and a support base 307 arranged below the selecting member 305 and corresponding to the carrier base 301.

The selecting member 305 is composed of a belt extending in opposition to all the bottom surface of the tray. The belt is wound around a pair of drums 320A and 320B and is moved in X direction by rotation of the drums to select predetermined cells of the seedling culture tray successively. As the seedling culture tray in this embodiment has six cells in each of rows in the width direction or Y direction, the selecting member 305 includes three selecting holes 308 whose intervals in the Y direction correspond to intervals of every other cell 203.

The driving unit 306 comprises first driving device 309 for slidably driving the belt 305 as the selecting member in the X direction, and second driving device 310 for slidably driving the selecting member 305 in the Y direction. The second driving device 310 has two guide rods 321A and 321B extending in the Y direction and in parallel with the seedling culture tray. The one guide rod 321A is partially formed with screw threads to form a pair of feeding screws which serve to drive the selecting member 305 in the Y direction. The other guide rod 321B serves only to guide the first driving device 309 in the Y direction. The guide rod 321A is provided at one end with a reversible servomotor 322 fixed to the frame of the vehicle body 1. The other end of the guide rod 321A, in turn, is rotatably mounted on the frame of the vehicle body 1. Therefore, when the servomotor is energized to be rotated predetermined rotations, the guide rod 321A is rotated so that the first driving device 309 is fed a predetermined distance in the Y direction.

The first driving device 309 comprises a pair of feeding portions 323A threadedly engaging the feeding screws of the guide rod 321A, a pair of feeding portions 323B slidably engaging the guide rod 321B, reversible servomotors 324A and 324B fixed to the respective feeding portions 323A and 323B for feeding the belt 305 predetermined distances in the X direction, and drums 320A and 320B respectively connected to the servomotors 324A and 324B for winding the belt 305 therearound. The drums 320A and 320B are connected to the servomotors 324A and 324B through rotating shafts provided on the drums 320A and 320B. The pairs of the feeding portions 323A and 323B, the servomotors 324A and 324B and the drums 320A and 320B above described are arranged opposed on both sides of the seedling culture tray 2. With such an arrangement of the first and second driving device, the belt 305 to be wound around the drums 320A and 320B needs to have a width and a length sufficient to be able to move the selecting holes 308 thereof in the X direction between the ends of the seedling culture tray.

The support base 307 is fixed to the frame of the vehicle body 1 and has a plurality of openings 314 corresponding in shape and arrangement to the openings 304 of the carrier base 301. The openings 314 of the support base 307 are aligned with the respective opening 304 of the carrier base 301 and permit the seedlings to pass therebetween. As shown on FIG. 8, the transfer pipes 303 are connected to the underside of the support base 307. The transfer pipes 303 are composed of a plurality of first branch pipes 315 connected to the openings 314 of the support base 307, a funnel-shaped collecting portion 316 gathering together the branch pipes 315, a second branch pipe 317 extending downstream of the collecting portion 316, and a main pipe 318 gathering together second branch pipes 317 and extending to the seedling force-transfer device 4. In this embodiment, the support base 307 includes the twelve openings 314 in each longitudinal row and six openings 314 in each traverse row. Therefore, if eight openings 314 (four in the longitudinal row and two in the traverse row) of the support base 307 are set in a block, the openings 314 are divided into nine blocks. In other words, one block includes eight first branch pipes 315 and one second branch pipe 317 collecting the eight first branch pipes 315 in the collecting portion 316 (FIG. 8). With the nine blocks each constructed above described in this embodiment, three second branch pipes 317 in a longitudinal row are gathered together in one main pipe 318, so that main pipes are located one in each of longitudinal rows including even and odd number of longitudinal rows. In this case, the number of the main pipes 318 is equal to that of the selecting holes 308 of the selecting member 305. This arrangement enables one of the selecting holes 308 formed in the belt 305 as the selecting member to take charge of the openings 304 in two longitudinal rows (twenty-four openings 304 in this embodiment) by sliding the belt 305 in the X and Y directions. While the above construction is only one example, it will be apparent, for example, that the support base 307 may be divided into blocks of a desired number and the number of the branch pipes may be changed depending upon the number of the blocks.

In the seedling taking-out device 3 according to this embodiment, the openings 304 of the carrier base 301 are arranged in a manner that each of them is aligned with each of the openings 314 of the support base 307, and the selecting member 305 is arranged between and slidably contacts with the carrier base 301 and the support base 307.

The operation of the seedling taking-out device constructed as described above will be explained hereinafter. First, the seedling culture tray 2 is suitably arranged on the carrier base 301. In this case, the selecting member 305 is previously positioned relative to the seedling culture tray 2 so that the selecting holes 308 of the selecting member 305 are aligned with the open bottoms at the one end of the seedling culture tray 2. The seedling force-transfer device 4 arranged downstream of the transfer pipes 303 is then actuated to cause negative pressure in the transfer pipes 303 so as to take the first seedlings out of open bottoms at the one end of the seedling culture tray. This seedlings pass through the selecting holes 308 and the openings 314 of the support base 307 and thereafter through the first branch pipes 315, the second branch pipes 317 and the main pipes 318 into the transplantation device 5 later described in detail. After the taking-out of the seedlings from the tray, at least the servomotor (324B in this embodiment) arranged on the advancing side of the belt 305 is energized to be rotated a predetermined amount to unwind a predetermined length of the belt 305 from the drum 320A and at the same time to wind the same length of the belt 305 around the drum 320B in order to bring the selecting holes 308 into alignment with the next openings 304 adjacent the above openings 304 in the longitudinal direction (X direction). As a result of this, new seedlings are taken out of the cells 203 and fed through the transfer pipes 303 into the transplanting device 5. While such an operation is repeated, the selecting holes 308 of the belt 305 are successively moved in the X direction to the open bottoms 205 at the other end of the seedling culture tray. Thereafter, the servomotor 322 of the second driving device 310 is energized to move the selecting holes 308 of the belt 305 a predetermined distance in the Y direction by device of the first driving device 309 with the aid of its screw-thread feeding in order to bring the selecting holes 308 into alignment with the openings 304 adjacent the above openings 304 in the Y direction. As a result of this, new seedlings adjacent to the already taken out seedlings in the Y direction are selected and taken out of the cells 203. After the new seedlings have been fed, the servomotor (324A in this embodiment) of the first driving device 309 is energized to unwind a predetermined length of the belt 305 from the drum 320B and at the same time to wind the same length of the belt around the drum 320A in order to bring the selecting holes 308 into alignment with the next openings 304 adjacent the above openings 304 in the longitudinal direction. While these operations are successively repeated, the selecting holes 308 of the belt 305 are moved to the open bottoms 205 at the one end of the seedling culture tray (on the side of the guide rod 321A). When the selecting holes 308 arrive at the open bottoms 205 at the one end of the tray, a series of the taking-out operations of the seedlings are completed.

The belt 305 as the selecting member is not limited to the construction as above described. As shown in FIG. 9, for example, in addition to the three selecting holes 308 aligned in the width direction, three second selecting holes 308A may be formed in the belt 305, which are also aligned in the width direction and spaced in the longitudinal direction from the first selecting holes 308. These second selecting holes 308A are positioned shifted one half of the distance between the first selecting holes 308 in the Y direction. After all the seedlings in charge of the first selecting holes 308 have been taken out, the second selecting holes 308A are to be moved by further rotations of the drums 320A and 320B to positions where seedlings in the remaining rows can be taken through the second selecting holes 308A out of the tray. In other words, the second selecting holes 308A are located spaced a distance more than the length of the tray from the first selecting holes 308. With this arrangement, it is possible to take all the seedlings out of the tray, while the drums 320A and 320B are continuously rotated. Therefore, the second driving device 310 can be dispensed with so that the setting machine can be more simplified in construction. Moreover, the number and the positional relationship of the selecting holes can be suitably modified depending upon the number and the arrangement of the cells of the seedling culture tray.

A modification of the seedling taking-out device 3 according to the invention shown in FIG. 10 will be explained hereinbelow. A carrier base 301 as a supporting member in this embodiment is fixed to a top of a frame on a vehicle body 1 and has a plurality of openings 304 corresponding in shape and arrangement to the open bottoms 205 of the seedling culture tray 2 (FIG. 1). A seedling selecting mechanism 302 arranged below the carrier base 301 is composed of a slide block 305 as a selecting member slidable relative to and in parallel with the lower surface of the carrier base 301 and driving device 306 for moving the slide block 305 in two dimensional directions, that is to say, a longitudinal (X) direction and a width (Y) direction. The slide block 305 is in the form of a rectangle formed with three selecting holes 308 extending through the slide block 305 from its upper surface to its lower surface. The selecting holes 308 are arranged with intervals in the Y direction corresponding to the intervals of cells 203 of the seedling culture tray and connected to three transfer pipes 303 through flexible pipes on the lower surface side, respectively. The driving device 306 is composed of first driving device 309 for sliding the slide block 305 in the X directions and second driving device 310 for sliding the slide block 305 in the Y direction.

The first driving device 309 comprises a pair of first guide rods 330 engaging the slide block 305 and a first driving mechanism 331 for driving the guide rods 330 in the X direction. The first driving mechanism 331 comprises a pair of first rotating shafts 332A and 332B extending in the Y direction and arranged opposed to each other on both sides of the carrier base 301 and a pair of first driving belts 333 connecting together the first rotating shafts 332A and 332B and the first guide rods 330.

The pair of the first driving belts 333 are arranged on both sides of the carrier base 301 and extend in the X direction for connecting the pulleys 334A and 334B fixed to the first rotating shafts 332A and 332B and pulleys 335A and 335B rotatably mounted at both ends of the first guide rods 330. Therefore, when the pulleys 334A and/or 334B arranged at the ends are rotated, the first driving belts 333 run to cause the first guide rods 330 to move in the X direction. For this purpose, a reversible servomotor 336 is provided at one end of any one (332A in this embodiment) of the first rotating shafts 332A and 332B, while the other end is rotatably supported in the frame of the vehicle body 1. Both ends of the other first rotating shaft 332B are rotatably mounted on the frame of the vehicle body 1.

The first guide rods 330 extend in the Y direction through the slide block 305 and are in sliding contact with the slide block 305 therein. It should be noticed that the first guide rods 330 do not intersect the selecting holes 308 of the slide block 305. The first driving belts 333 are preferably cog or toothed belts and the pulleys 334A, 334B, 335A and 335B are also preferably toothed pulleys correspondingly in order to move the slide block 305 predetermined distances by device of the servomotor 336.

The second driving device 310 is substantially the same in construction as the first driving device. In more detail, the second driving device 310 comprises a pair of second guide rods 340 engaging the slide block 305 and a pair of second driving belts 343 for connecting together these guide rods 340. The pair of the second driving belts 343 extend in the Y direction for connecting together pulleys 344A and 344B fixed to second rotating shafts 342A and 342B and pulleys 345A and 345B rotatably mounted on both the ends of the second guide rods 340. One end of any one (342A in this embodiment) of the two second rotating shafts 342A and 342B is connected to a reversible servomotor 346, while the other end of the second rotating shaft 342A is rotatably mounted on the frame of the vehicle body 1. The second guide rods 340 above described extend in the X direction through the slide block 305. The second guide rods 340 require to extend so as not intersect the first guide rods 330 and the selecting holes 308 of the slide block 305.

The operation of the seedling taking-out device constructed as above described will be explained hereinafter. First, the seedling culture tray 2 is arranged on the carrier base 301 so as to cause the open bottoms 205 of the tray 2 to be aligned with openings 304 of the carrier base 301, and the selecting holes 308 of the slide block 305 are brought to be aligned with the open bottoms 205 at one end of the seedling culture tray 2. The seedling force-transfer device 4 downstream of the transfer pipes 303 is then actuated to cause negative pressure in the pipes 303 so that three seedlings above the selecting holes 308 are fed through the transfer pipes 303 into transplanting device 5 later explained in detail. Thereafter, the servomotor 336 of the first driving device 309 is actuated to move the driving belts 333 a predetermined distance so that the first guide rods 330 are moved the predetermined distance in the X direction (opposite to arrow X in FIG. 10 in this embodiment) in order to bring the selecting holes 308 into alignment with next openings adjacent in the longitudinal direction. As a result of this, new seedlings are selected to be taken out of the cells 203 and fed through the transfer pipes into the transplanting device 5. While such a controlled feeding of seedlings is repeated, the slide block 305 is moved to the opening bottoms 205 at the other end of the seedling culture tray. Thereafter, the servomotor 346 of the second driving device 310 is energized to move the belts 343 a predetermined distance so as to move the second guide rods 340 the predetermined distance (three times the interval in the width direction between the cells of the seedling culture tray in this embodiment) in the Y direction in order to bring the selecting holes 308 into alignment with the openings 304 adjacent in the Y direction. As a result of this, three new seedlings adjacent in the Y direction are taken out of the cells 203 and fed into the transplanting device 5. After feeding these seedlings, the control motor 336 of the first driving device 309 is energized to be rotated in the reverse direction so as to move the slide block 305 a predetermined distance in the X direction so that the selecting holes 308 are brought into alignment with the next openings 304 adjacent in the longitudinal direction for taking new seedlings out of the cells. A series of such operations are successively repeated, while the selecting holes 308 of the slide block 305 are moved in the longitudinal direction to the open bottoms 205 at the end of the seedling culture tray. When the selecting holes 308 of the slide block 305 have arrived at the open bottoms at the end of the tray, the operation of the taking-out of the seedlings is completed.

Seedling Force-Transfer Device

The seedling force-transfer device to be used in the setting machine according to the invention will be explained hereinafter.

FIGS. 11 and 12 illustrate the principal parts of the seedling force-transfer device arranged downstream of the transfer pipes 303 connected to the selecting holes 308 of the openings 314 of the support base 307 (or selecting holes 308 of the selecting member 305, as the case may be). As shown in FIG. 1, the seedling force-transfer device is composed of a suction pump 401 driven by an engine 101 for causing negative pressure in the transfer pipe 303, a suction pipe 402 connected to the suction pump 401, and a suction portion 403 for connecting the suction pipe 402 to the transfer pipe 303. The suction portion 403 comprises a cylindrical surrounding member 405 for surrounding a plurality of openings 404 formed in the circumferential wall of the transfer pipe on the downstream side thereof. The surrounding member 405 is formed to have a shape and a size to provide a constant clearance relative to the outer circumferential surface of the transfer pipe 303 and surrounds all the openings 404. In other words, the transfer pipe 303 extends through the center portion of the surrounding member 405 in the axial direction and is connected to the surrounding member 405 in an airtight manner. One end of the suction pipe 402 is connected to the circumferential wall of the surrounding member 405 in an airtight manner. With the suction portion 403 constructed as above described, seedlings fed from the upstream side of the suction portion 403 can be fed onto the downstream side of the suction portion 403 (as shown by an arrow Z) without carrying the seedlings into the suction pipe 402. In this case, it is preferable to arrange the transfer pipe 303 in the vertical direction in the proximity of the suction portion 403 in order to give inertia force to the seedling when it passes through the suction portion 403. Moreover, the transfer pipe is provided at its end with a gate valve 406 so that the seedling is subjected to sufficient negative pressure by maintaining the gate valve 406 closed during the taking-out and transfer of the seedling in the transfer pipe 303. The taking of the seedlings out of the bottom of the seedling culture tray is accomplished by connecting the seedling force-transfer device 4 and the taking-out device 3 constructed as above described with the transfer pipe 303.

Transplanting Device

The transplanting device 5 to be provided on the setting machine according to the invention will be explained herein below. As shown in FIGS. 1 and 13, the respective transplanting device 5 arranged in parallel are connected to downstream ends of the main pipes 318 of the transfer pipes 303. The transplanting device 5 is composed of a transplanting mechanism 501 for transplanting seedlings fed through the transfer pipes 303 along predetermined transplantation ridges in a field, and a frame 504 having a pair of front wheels 502 and a pair of rear wheels 503 mounted thereon for guiding the transplanting mechanism 501 along the transplantation ridges in the field as shown in FIGS. 14 and 15.

The transplanting mechanism 501 is composed of planting device 520 for forming holes 54 in the ground along predetermined ridges in a field, for example, covered by mulches 510 (FIG. 17) and transferring seedlings into the holes 54, driving device 521 for driving the planting device 520 at least in vertical directions, guide device 525 for guiding the vertical movements of the planting device, and control device 522 for controlling the time when the seedlings fed through the transfer pipes 303 are supplied into the planting device 520.

Figure 16:
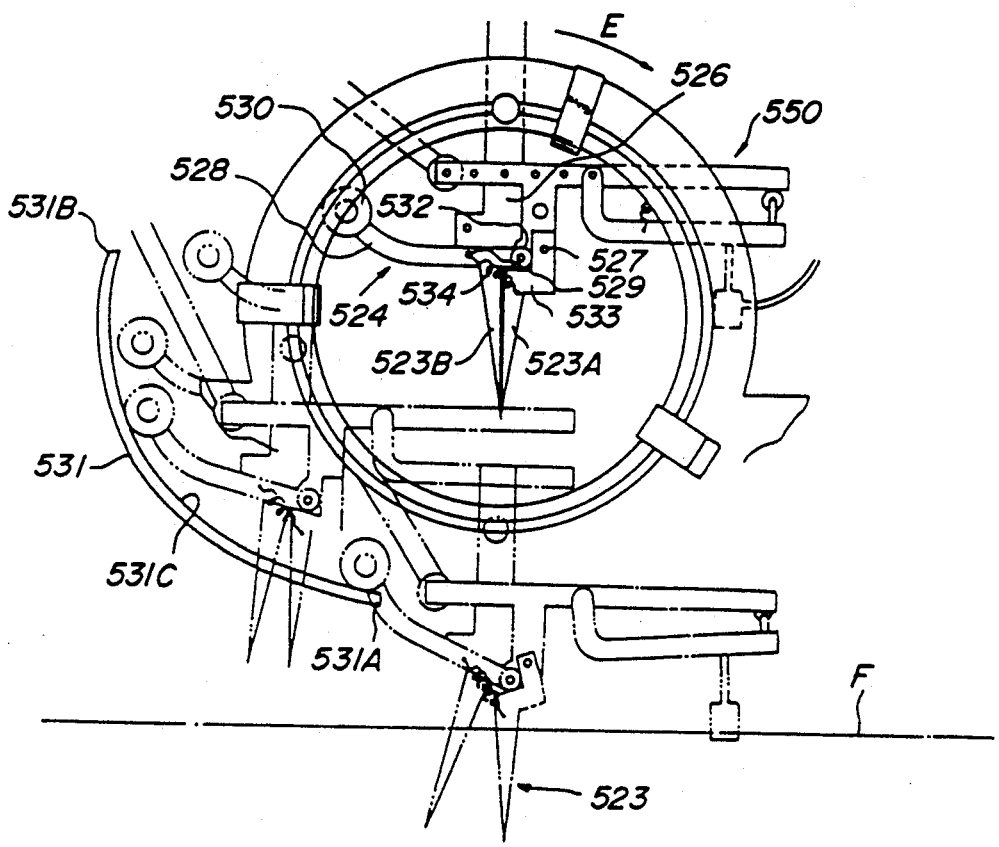
FIG. 16 is an explanatory view illustrating a construction of planting device provided in the transplanting device.

The planting device 520 comprises an openable and closable drilling unit 523 in the form of a "bill" for forming holes 54 along transplantation ridges in the field and an actuator mechanism 524 for timely opening and closing of the drilling unit 523. The drilling unit 523 is composed of a first drilling member 523A and a second drilling member 523B in pair to form the bill-shaped unit and arranged under a main body 526 of the planting device 520. As shown in FIG. 16, the first drilling member 523A is pivotally connected with its upper end to main body 526 so as to be rotatable about a pivot point 527. To the upper end of the second drilling member 523B is fixed an operating arm 528 constituting part of the actuator mechanism 524. The operating arm 528 extends substantially horizontally and is pivotally connected with its one end to the main body 526 to be rotatable about a pivot point 529. The operating arm 528 is provided at the other end with a roller 530 which co-operates with a roller guide member 531 later described constituting part of the open and close mechanism 524. The operating arm 528 is provided on the side of the pivot point 527 of the first drilling member 523A with an urging roller 532 which urges the first drilling member 523A upon rotation of the operating arm 528 about the pivot point 529 to rotate the first drilling member 523A about the pivot point 527. In order to properly urge the first drilling member 523A, the first drilling member 523A is formed with a shoulder 533 positioned between the pivot point 527 and the front end of the first drilling member 523A to form a substantially horizontal operating surface in the proximity of the end of the first drilling member on the side of the pivot point 527. This operating surface is arranged closely to the underside of the urging roller 532.

On rotating the operating arm 528 about the pivot point 529, therefore, the second drilling member 523B fixed to the operating arm 528 is pivotally moved toward the side of the operating arm 528, and in conjunction therewith the the urging roller 532 of the operating arm urges the shoulder 533 of the first drilling member 523A downwardly to displace it about its pivot point 527 away from the second drilling member 523B. In other words, when the operating arm 528 is rotated, the closed drilling unit 523 is opened. In order to return the open drilling unit 523 into the initial closed condition, a tension spring 534 is arranged between the first and second drilling members 532A and 532B.

In order to timely rotate the operating arm 528, the roller guide member 531 is secured to the frame 504 to form part of the actuator mechanism (FIGS. 14 and 15). As shown in detail in FIG. 16, the roller guide member 531 is arcuate and arranged within the movement range of the roller 530. In this embodiment, the roller guide member 531 is so arranged that its one end 531A is located in a position where the roller 530 of the operating arm 528 starts to engage the one end 531A of the roller guide member 531 when the planting device 520 has been moved to the lowermost position. Moreover, the other end 531B of the roller guide member 531 is arranged at a position where the roller 530 starts to disengage from the guide member 531 when the planting device 520 has been rotated from the upper position substantially three fourths of its one rotation in a direction shown by an arrow E. An arcuate slide guide surface 531C is formed between the ends 531A and 531B of the roller guide member 531. Rotating angles of the operating arm 528 vary depending upon distances between engaging positions of the roller 530 with the guide surface 531C and centers of revolution orbits of the roller 530. In other words, if the roller 530 engages the guide surface 531C at a position which is remote from the center of the revolution orbit of the roller 530 moving with the revolution of the planting device 520, the rotating angle of the operating arm 528 becomes smaller. On the other hand, if the roller 530 engages the guide surface 531C at a position which is close to the center of the revolution orbit of the roller 530, the rotating angle of the operating arm 528 becomes larger. Therefore, the curvature of the roller guide member 531 needs to be determined in consideration of the above relation. The guide surface 531C of the guide member 531 in this embodiment is so arranged that the rotating angle of the operating arm 528 becomes the maximum value when the planting device 520 has been rotated from the uppermost position substantially one half of the revolution in the direction E so that the roller 530 has arrived at the end 531A of the guide member 531, while the operating arm 528 assumes substantially horizontal position when the planting device 520 has been rotated substantially three fourths of the revolution so that the roller 530 has arrived at the other end 531B of the guide member 531. As shown in FIG. 16, moreover, the slide guide surface 531C of the guide member 531 is curved in a manner that the rotating angle of the operating arm 528 progressively decreases as the roller 530 moves upwardly between the ends 531A and 531B of the slide guide member 531. Therefore, the open angle of the drilling unit 523 becomes the maximum (to such extent as to enable a seedling to fall into a hole 54) when the planting device 520 has been rotated from the uppermost position shown in solid lines in FIG. 16 substantially one half of the revolution in the direction E so that the drilling unit 523 has arrived at the deepest position in the ground. While the planting device 520 rotates from the position of substantially one half rotated position to the position of three fourths rotated position, the rotational angle of the drilling unit 532 progressively decreases and becomes 0° when the planting device 520 has arrived at the position of the three fourths rotated position and the drilling unit has raised sufficiently from the ground surface F. Under this condition, the planting device 520 is moved to the initial uppermost position to complete the transplantation of one seedling.

Guide device 525 for causing the suitable rotation of the planting device 520 is composed of a pair of support members 540A and 540B provided on the main body 526 of the planting device, and a pair of guide discs 541A and 541B in the form of circular plates vertically fixed to the bottom surface of the frame 504 for guiding the support members 540A and 540B as shown in FIG. 14.

The support members 540A and 540B in the form of bars are provided on the main body 526 so as to extend vertically relative to side surfaces of the guide discs 541A and 541B. Moreover, the support member 540B is arranged eccentric relative to and vertically above the support member 540A. Therefore, the support members 540A and 540B extend in parallel with and vertically spaced a predetermined distance from each other and are fixed to opposed surfaces of the main body 526 so as to be perpendicular to side surfaces of the guide discs 541A and 541B, respectively.

The guide discs 541A and 541B are provided in parallel with the side surfaces of the frame 504 and formed with guide grooves 542A and 542B for guiding the support members 540A and 540B. The guide grooves 542A and 542B are annular as shown in FIG. 15. The center of the annular guide groove 542B is arranged eccentric to and vertically above the center of the annular guide groove 542A. The eccentric distance between the centers of the guide grooves 542A and 542B is coincident with the eccentric distance between the support members 540A and 540B. The guide grooves 542A and 542B are not limited to the annular ones as shown but may be suitably modified. For example, elliptical could be preferable as the case may be.

As the guide device 525 is constructed as the above described, the main body 526 of the planting device is caused to perform the proper rotating movement, and at the same time the bill-shaped drilling unit 523 can be maintained in the vertical direction.

Figure 17:
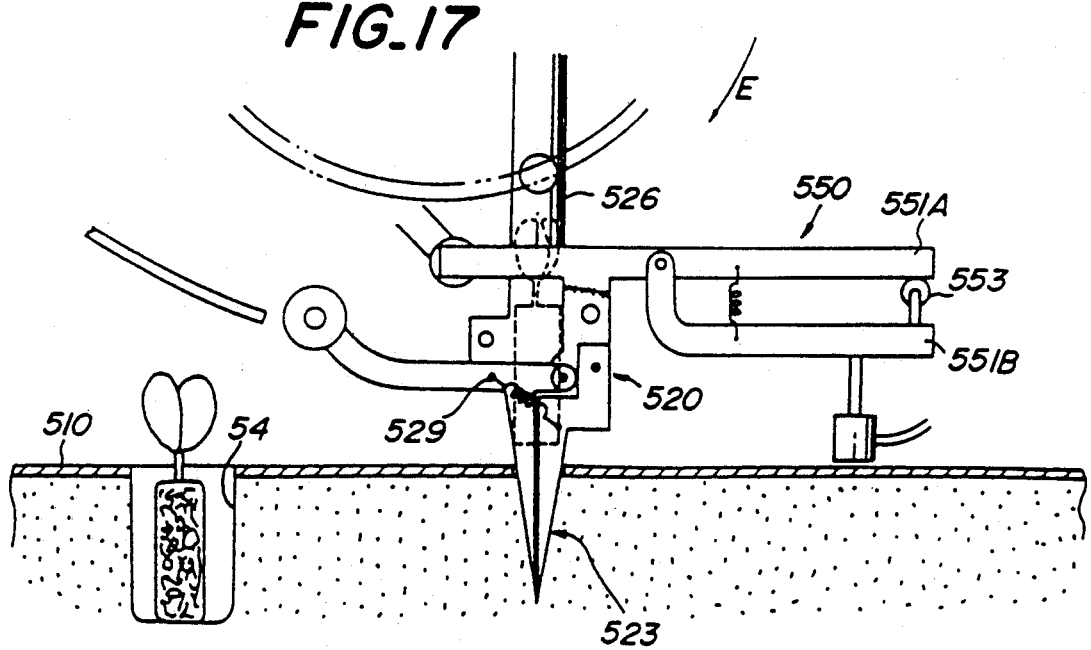

The driving device 521 for driving the planting device 520 includes a hydraulic cylinder 543 having a piston rod whose rod end is pivotally connected to the main body 526 of the planting device. The head end of the cylinder is pivotally connected to the frame 504. Therefore, a reciprocal movement of the piston of the cylinder 543 causes a rocking movement of the hydraulic cylinder 543 as shown in FIG. 15. Upon rotating the planting device 520 from the position shown in solid lines in FIG. 15 into the direction E, the piston of the hydraulic cylinder 543 is controlled in a manner that the piston continues to advance until the piston intersects the center of the guide groove 542 and thereafter the piston continues to retract until the piston again intersects the center of the guide groove 542. Moreover, the hydraulic pressure of the hydraulic cylinder has to be controlled in such a manner that notwithstanding the advancement of the transplanting device 5, the drilling unit 523 being positioned in the ground is stationary at a predetermined position and adapted to undergo a vertical movement only in the vertical direction without moving in advancing and retracting directions relative to the ground surface (FIGS. 17 to 19). As shown in FIG. 15, the planting device 520 is subjected to a force in an inclined direction from the above and rearward from the hydraulic cylinder 543, the moving speed is divided into a horizontal moving speed $V_1$ and a vertical moving speed $V_2$. Therefore, when the setting machine is being advanced at a speed V, the planting device is controlled by adjusting the hydraulic pressure of the hydraulic cylinder 543 at least during the drilling unit being in the ground in a manner that a horizontal moving speed $V_1$ of the planting device becomes equal to the moving speed V of the setting machine but in the opposite direction $(V_1 = -V)$. With such a control, even when the planting device 520 is subjected to a force in a direction which is inclined upwardly and rearwardly, the planting device 520 is stationary in the horizontal direction at a predetermined position relative to the transplanting ridge for a predetermined period of time, but at the same time the planting device is adapted to be moved in a vertical direction at a suitable speeds.

Control Device

The control device 522 for controlling the time when the seedlings transferred in the transfer pipes are fed into the planting device 520 comprises a gate valve 544 provided in the proximity of the downstream most end of the transfer pipe 303, a hydraulic cylinder 545 for opening the gate valve 544, a compression spring 546 for closing the gage valve 544 as shown in FIG. 14.

The gate valve 544 is composed of a movable plate which is pivotally received on a top plate 547 fixed to the upper surface of the frame 504 so as to be rotated in a horizontal plane about a pin 548. The gate valve 544 may be substantially the same as the gate valve 406

(FIG. 11) explained in connection with the seedling force-transfer device.

The rod end of the piston rod of the hydraulic cylinder 545 fixed to the top plate 547 and hydraulically controlled is connected to a portion of the gate valve 544 on the opposite side of the pin 548 with respect to the transfer pipe 303. In this embodiment, the hydraulic cylinder 545 includes a single-acting piston which is retracted into the cylinder 545 by hydraulic pressure acting upon the piston for opening the gate valve 544 and is extended in the opposite direction by the spring force of the compression spring 546 under no hydraulic pressure. In order to smoothly extend the piston, the piston rod of the piston and the compression spring 546 are arranged in alignment with each other and one end of the spring 546 is connected to the rod end of the piston rod and the other end is fixed to the top plate 547.

With the control device 522 constructed as above described, the time when the seedlings are fed into the planting device 520 can be suitably controlled. According to this embodiment, in the event that a seedling is arranged in the drilling unit 523 and in the event that the drilling unit 523 is opened, the gate valve is maintained in the closed condition by device of the compression spring 546 so that the seedling fed through the transfer pipe 303 is once stopped before the planting device. When the drilling unit 523 has arrived at a position in the proximity of the uppermost position, the hydraulic pressure is applied into the hydraulic cylinder 545 to open the gate valve 544 so that the seedling is fed into the planting device. The actual opening and closing time of the gate valve 544 in this embodiment will be explained later.

Mulch Opening Device

As shown in FIG. 15, if required, the main body 526 of the planting device may be provided with an additional mulch opening device 550 which is composed of a support member 551 extending forward from the main body 526 in the horizontal direction and fixed with one end to the main body, and an urging trowel 552 mounted on the front end of the support member 551.

The support member 551 is composed of a main arm 551A having one end fixed to the main body 526 and an L-shaped branch arm 551B pivotally connected to the center portion of the main arm 551A. A buffer member 553 and a tension spring 554 are secured to both the arms 551A and 551B therebetween. The buffer member 553 is secured to the front end of the branch arm 551B for maintaining the distance between both the arms 551A and 551B constant and is so arranged as to abut against the main arm 551A in order to absorb the force acting upon the branch arm. The tension spring 554 serves to apply tensile force between both the arms in order to maintain the buffer member 553 abutting against the main arm 551A.

The urging trowel 552 is cylindrical and provided at underside of the branch arm 551B (FIG. 14). Moreover, the urging trowel 552 includes therein a gas burner for keeping high temperature required to form openings 555 (FIG. 19) in the mulch 510 made of a plastic material. The urging trowel 552 serves to remove predetermined portions of the mulch 510 which will obstruct the transplantation of seedlings using the drilling unit. Therefore, the urging trowel 552 requires to have a function capable of forming openings 555 in the mulch at positions corresponding to the drilling unit before it is inserted into the ground along the transplantation ridges. Moreover, the urging trowel 552 requires to have a function capable of rotating in synchronism with the rotation of the planting device 520 in order to form an opening in the mulch previously for transplanting a next seedling during transplanting a preceding seedling using the drilling unit. Accordingly, the urging trowel 552 is arranged on the underside of the branch arm 551B at the position where the bottom surface of the urging trowel is brought into contact with the surface of the mulch during the transplantation of the seedling using the drilling unit and the urging trowel is able to open the mulch openings 555 successively with intervals equal to those of the transplantation of the seedlings by the drilling unit.

The mounted position of urging trowel 552 should be changed depending upon the moving speed of the transplanting device 5 and the rotating speed of the planting device 520. It is, therefore, preferable that the urging trowel 552 is slidable in longitudinal direction of the branch arm 551B and able to be fixed at any desired position and that the urging trowel 552 is displaceable in vertical direction relative to the branch arm and able to be fixed at any desired position. In practice, the underside of the branch arm 551B is formed with a plurality of internal threads with predetermined intervals, which are adapted to threadedly engage with the rod 552A of the urging iron 552, thereby enabling the urging trowel 552 to be adjusted in the horizontal directions. Moreover, the rod 552A and the trowel main body 552B are threadedly connected with each other. With this arrangement, by adjusting threaded length between the rod 552A and the trowel main body 552B, the position of the urging trowel 552 is adjustable in vertical directions also.

Transplantation of Seedlings

The transplantation of seedlings with the transplanting device 5, particularly by the use of the drilling unit 523 will be explained with reference to FIGS. 16 to 19 hereinafter.

A seedling fed through the transfer pipe 303 is once stopped on the gate valve 544. The gate valve 544 is opened to drop the seedling into the planting device 520 when the drilling unit 523 has arrived at a position close to the uppermost position. The fallen seedling is fed through the through-passage formed in the main body 526 of the planting device 520 to the drilling unit 523 in the closed condition and kept in the drilling unit 523 until it has arrived at the position shown in FIG. 17. Thereafter, when the drilling unit has been moved nearly to the substantially lowermost position and sufficiently inserted into the ground as shown in FIG. 8, the roller 530 of the operating arm 528 abuts against the end of the slide guide member 531 so that the operating arm 528 is raised upwardly to open the drilling unit by the lever action of the operating arm 528 as described above. At this moment, the urging trowel 552B provided in the mulch opening device 550 forms an opening 555 in the mulch 510. Thereafter, while the roller 530 moves on the slide guide surface 531C, the drilling unit 523 is maintained in the opened condition and continues to move vertically, leaving the seedling behind in the hole 54. When the drilling unit has arrived at an upper position sufficiently spaced from the ground surface, the roller 530 disengages from the slide guide surface 531C to close the drilling unit. At the time when the drilling unit has been moved nearly to the uppermost position, a new seedling is fed into the planting device as well. Thereafter, the operation described above is repeated.

The drilling unit is fully opened when it has been moved to the lowermost position in this embodiment. However, the engaging positional relationship between the roller 530 and the slide guide member 531 may be so adjusted that while the drilling unit is being raised, it is progressively opened to arrange the seedling into the hole 54. Such an arrangement is preferable in the case that the soil in the field is somewhat hard.

Mud Removing Device

Figure 20:
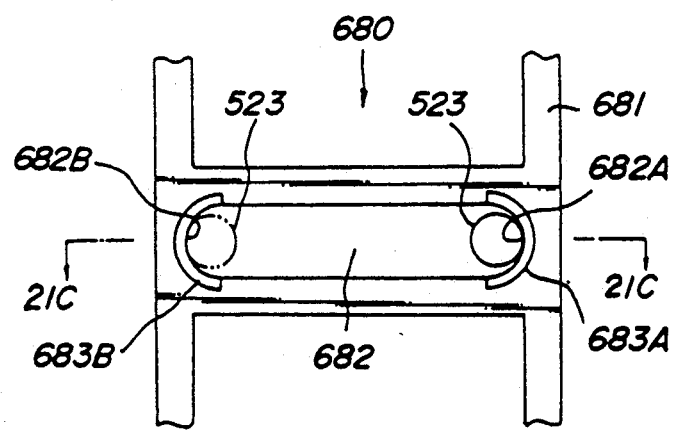
FIG. 20 is a plan view of mud removing device provided in the transplanting device.
Figure 21C:
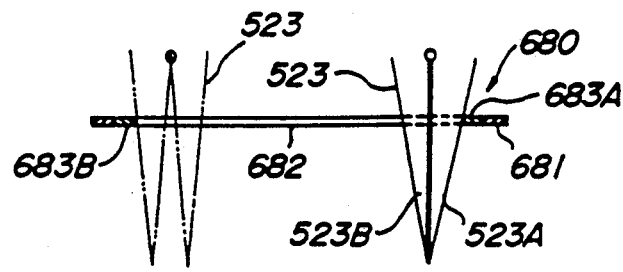
FIG. 21 is a sectional view taken along the line C—C in FIG. 20.

Mud removing device 680 is arranged below the drilling unit 523 for removing mud stuck to the drilling unit 523 as shown in FIGS. 14, 20 and 21. The mud removing device 680 includes a support member 681 fixed in a manner bridging lower frame members of the frame 504, and a mud removing opening 682 formed in the support member 681 at its center. The support member 681 is in the form of a thin plate and arranged extending above the transplantation ridges. The mud removing opening 682 is formed elongated in the moving direction of the setting machine. Both ends 682A and 682B of the opening 682 are semicircular and located at positions where these ends contact side surfaces of the drilling unit when the drilling unit 523 is raised and lowered. In more detail, when the drilling unit 523 is lowering, the surface of the first drilling member 523A comes in contact with the end 682A of the opening to remove mud on the surface, while when the drilling unit 523 is rising, the surface of the second drilling member 523B comes in contact with the end 682B of the opening to remove mud on the surface. Each of the ends 682A and 682B of the opening 682 is preferably provided with mud removing elastic members 683A and 683B made of an elastic rubber. By providing such elastic members, the mud removing device can be brought into closer contact with the surfaces of the drilling unit to perform more effective mud removing.

The planting device 5 described above may be arranged independently from each other as shown in FIG. 13. On the other hand, the front and rear wheels 502 and 503 provided on the respective planting device 5 may be connected by shafts. In this case, elastic members, for example, springs are provided at ends of the shafts and between the wheels so that the respective planting device 5 can be properly followed to corresponding transplantation ridges even if the ridges are formed as levees.

Operation of the Entire Setting Machine

Figure 22:
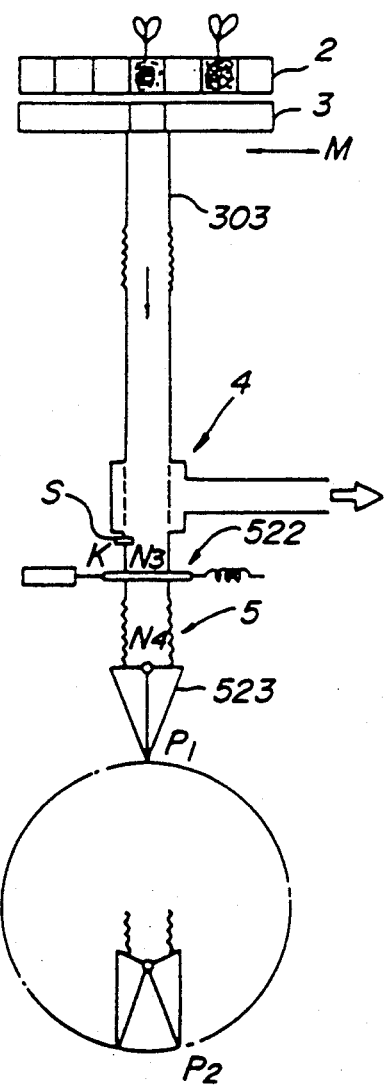
FIG. 22 is an explanatory view schematically illustrating principal parts of the setting machine.

Operation of the above-described respective devices provided in the setting machine and associated with each other will be explained with reference to FIGS. 22 and 23.

As the negative pressure always acts in the transfer pipes by actuating the seedling force-transfer device 4 during the transplanting operation, taken-out seedlings are always transferred in the transfer pipes from the upstream side (tray side) to the downstream side (drilling unit side). Therefore, the seedlings arranged in the seedling culture tray are taken out of the tray toward downwardly upon moving the selecting member 305 (M) of the seedling taking-out device 3 and fed through the transfer pipes 303 to the gate valve 544 (K) provided in the control device 522. At this moment, the gate valve 544 is kept in the closed condition so that the movement of the seedlings is once stopped at the position $N_3$ of the gate valve. Thereafter, when the drilling unit 523 provided in the transplanting device 5 has arrived nearly at the uppermost position $P_1$, the gate valve is opened so that the seedling is fed to the position $N_4$ in the drilling unit. Immediately thereafter, the gate valve 544 is closed and the same time the selecting member 305 moves for the predetermined time to take a next seedling from the seedling culture tray toward downwardly. The above series of operations are then repeated until completion of successive transplantation of all the seedlings in the seedling culture tray.

A sensor S is additionally provided as part of the control device at the gate valve position $N_3$. The sensor S serves to detect whether a seedling actually exists or not at the gate valve position $N_3$ immediately before the gate valve 544 is opened. In the case that no seedling is detected at the gate valve position $N_3$ by device of the sensor S, the setting machine itself is stopped and rested until a seedling has been supplied. Thereafter, the setting machine is started again. It is possible to prevent plantation ridges from missing seedling or seedlings in this manner.

Figure 23:
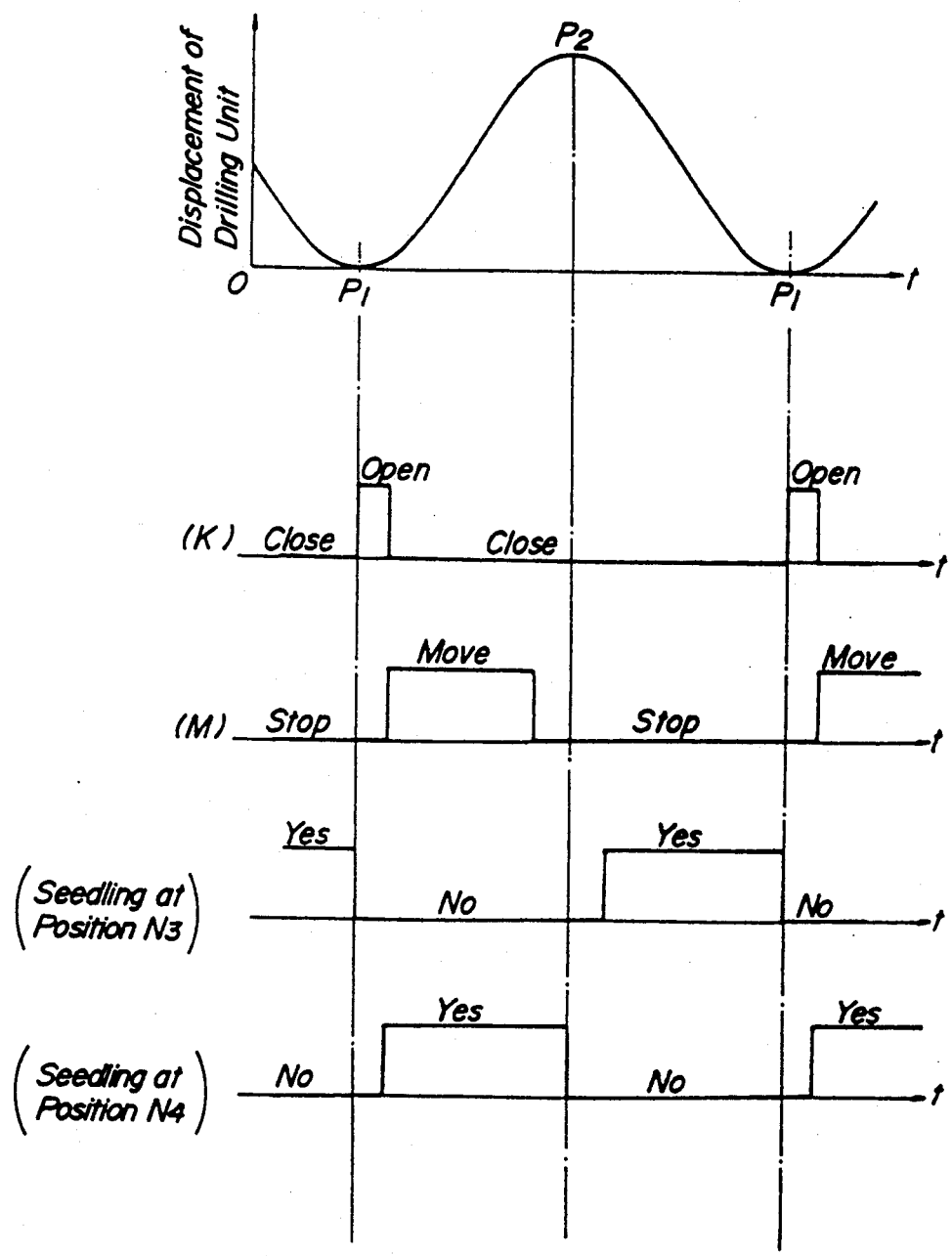
FIG. 23 is a time chart illustrating moving states of seedlings in the setting machine.

A chart with the lapse of time as shown in FIG. 23 is only one example. It is possible of course to modify such a chart in various manner if required.

While the setting machine has been explained with reference to the field not having any levee but having mulches, this invention is of course applicable sufficiently to fields having transplantation ridges formed by levees and not having any mulches.

As can be appreciated from the foregoing detailed explanation, the setting machine according to the invention comprises a movable vehicle body which comprises a seedling taking-out device for supporting thereon seedling culture trays made of synthetic resin having a plurality of cells accommodating therein seedlings to be transplanted, and for selectively taking the seedlings out of the cells of the trays, a seedling force-transfer device for forcedly transferring the taken-out seedlings under negative pressure to predetermined positions, and a transplanting device for receiving the seedlings transferred in the predetermined positions and transplanting them into the ground. Therefore, the setting machine according to the invention is capable of sufficiently accommodating seedling culture trays made of synthetic resin and can positively prevent roots of seedlings from being damaged in transplanting the seedlings with the setting machine. Moreover, according to the invention, all the operations from taking-out to transplantation of seedlings can be readily and completely automatized into consistent mechanical operations, and remarkable improvement in operating efficiency and significant saving in labor can be accomplished particularly in transplanting seedlings along multiple ridges in fields.

I claim:

1. A setting machine which includes a movable vehicle body comprising: seedling culture tray support means for supporting and holding stationary a seedling culture tray made of a synthetic resin having a plurality of cells containing seedlings to be transplanted; selector means for selectively taking the seedlings out of predetermined cells of said tray successively under negative pressure; seedling transfer means for forcibly transferring the taken out seedlings to a predetermined position under negative pressure, said transfer means including a transfer pipe having an upstream end for receiving the taken out seedlings and a downstream end horizontally offset with respect to said upstream end, and a negative pressure source connected to said transfer pipe at said downstream end for forcibly transporting the seedlings along said transfer pipe to the predetermined position; and transplanting means for receiving the seedlings transferred to the predetermined position thereat and transplanting them into ground, and wherein said selector means comprises selecting means formed with at least one selecting hole and means for moving said selecting means relative to the stationary seedling culture trays in predetermined directions in a plane which is parallel with a bottom surface of the seedling culture tray to bring said at least one selecting hole into alignment with predetermined cells of the seedling culture tray successively.

2. A setting machine as set forth in claim 1, wherein said tray support means comprises a support member for supporting the seedling culture tray, said seedling culture tray having a plurality of through-holes as said cells, said support member being formed with openings permitting to pass therethrough the seedlings taken out of said cells of the seedling culture tray through open bottoms of the cells.

3. A setting machine as set forth in claim 2, wherein said selecting means comprises a belt extending over an entire bottom surface of the support member and having a longitudinal direction and a width direction, and said means for moving said selecting means includes a pair of drums for winding-up the belt and causing the belt to move in its longitudinal direction, and first driving means for driving the drums for winding-up the belt, said at least one selecting hole including a plurality of selecting holes formed in said belt and spaced in width direction from each other, and said selecting holes being alignable with predetermined cells of the seedling culture tray in the longitudinal direction of the belt by driving the belt by said first driving means.

4. A setting machine as set forth in claim 3, wherein said means for moving said selecting means further comprises second driving means for driving said drums in the width direction of the belt, said selecting holes being alignable with predetermined cells of the seedling culture tray in the width direction of the belt by driving the belt by the first and second driving means.

5. A setting machine as set forth in claim 3, comprising a support base stationarily arranged adjacent to said belt on a side opposite to the support member of the seedling culture tray, for supporting said belt in airtight contact relation with said belt, said support base being formed with openings of the same arrangement and number as the openings of the support member, thereby enabling the seedlings to be taken out of the cells of the seedling culture tray and forcibly transferred through passages associated with the openings of the support base to a predetermined position when each selecting hole of the belt is aligned with an opening of the support base.

6. A setting machine as set forth in claim 2, wherein said selecting means comprises a slide block arranged adjacent to a bottom surface of said support member, and said means for moving said selecting means includes first driving means for moving the slide block in longitudinal direction of the seedling culture tray, and second driving means for driving the slide block in width direction of the seedling culture tray, said slide block being formed with at least one selecting hole which can be aligned with predetermined cell of the seedling culture tray by driving the slide block by the first and second driving means.

7. A setting machine as set forth in claim 6, wherein said slide block is formed with a plurality of selecting holes spaced from each other in at least one of the longitudinal and width directions of the seedling culture tray.

8. A setting machine as set forth in claim 6, wherein the setting machine is so constructed that said seedlings taken out of the cells of the seedling culture tray are forcibly transferred to the predetermined position through the selecting hole of the slide block and a passage connected to the selecting hole, said passage being flexible in a zone where the passage is connected to the slide block.

9. A setting machine as set forth in claim 2, wherein said transfer pipe extends from said selecting means substantially downwardly and horizontally to the predetermined position.

10. A setting machine as set forth in claim 9, wherein said transfer pipe is flexible at least in a connecting zone with the selecting means.

11. A setting machine as set forth in claim 9, wherein said negative pressure source comprises a suction pump for generating a negative pressure in said transfer pipe, a suction portion arranged adjacent to the transfer pipe at its downstream end and connected to the suction pump, and a gate valve for opening or closing the downstream end of the transfer pipe on a side of the transplanting means.

12. A setting machine as set forth in claim 11, wherein said transfer pipe is formed in its outer circumference with a plurality of openings which are surrounded by said suction portion.

13. A setting machine as set forth in claim 12, wherein said openings are substantially equi-angularly spaced in a circumferential direction in the outer circumference of the transfer pipe.

14. A setting machine as set forth in claim 11, wherein said transfer pipe extends in a vertical direction at least in a zone adjacent to said suction portion.

15. A setting machine as set forth in claim 11, further comprising control means including a sensor for detecting that a seedling has been transferred to the predetermined position by said transfer means, wherein said gate valve is adapted to be actuated.

16. A setting machine as set forth in claim 15, wherein said gate valve is maintained in its closed position while the seedling is being transferred in the transfer pipe, and said gate valve is opened when the seedling is supplied from the transfer pipe into said seedling transplanting means.

17. A setting machine as set forth in claim 1, wherein said seedling transplanting means comprises planting means having a first end for receiving a taken out seedling from the downstream end of said transfer pipe and a second end for drilling a hole in the ground and planting the seedling received from the first end into the hole, driving means for driving the planting means to cause its displacement at least in a vertical direction, and guide means for guiding said planting means being displaced in the vertical direction, said guide means maintaining the second end of the planting means substantially vertically relative to the ground surface at least when the planting means is being inserted into the ground.

18. A setting machine as set forth in claim 17, wherein said planting means is moved in a rearward direction relative to the setting machine at a speed equal to an advancing speed of the setting machine.

19. A setting machine as set forth in claim 17, wherein said second end of the planting means is formed in a bill-shaped drilling unit which is capable of undergoing opening or closing motion, and an actuator mechanism is provided for maintaining the drilling unit closed when being inserted into the ground, and opening the drilling unit when planting the seedling.

20. A setting machine as set forth in claim 17, wherein said guide means is so constructed as to guide the planting means along a predetermined path so that said second end alternately passes through a position where the second end penetrates into the ground and a position where the second end separates from the ground surface, while the planting means is maintained in a vertical position relative to the ground.

21. A setting machine as set forth in claim 17, wherein a hydraulic cylinder is provided as said driving means.

22. A setting machine as set forth in claim 17, wherein control means is provided which is displaceable between a position where a seedling is supplied to the first end of the planting means, and a position where the seedling is prevented from being supplied into the first end of the planting means.

23. A setting machine as set forth in claim 22, wherein said control means assumes said position where the seedling is supplied to the first end of the planting means when said second end of the planting means is in a position spaced from the surface of the ground.

24. A setting machine as set forth in claim 23, wherein said control means is actuated synchronously with rotating movement of running wheels of the setting machine.

* * * * *